(12) United States Patent
Wang et al.

(10) Patent No.: US 11,544,831 B2
(45) Date of Patent: Jan. 3, 2023

(54) UTILIZING AN IMAGE EXPOSURE TRANSFORMATION NEURAL NETWORK TO GENERATE A LONG-EXPOSURE IMAGE FROM A SINGLE SHORT-EXPOSURE IMAGE

(71) Applicant: Adobe Inc., San Jose, CA (US)

(72) Inventors: Yilin Wang, San Jose, CA (US); Zhe Lin, Fremont, CA (US); Zhaowen Wang, San Jose, CA (US); Xin Lu, Mountain View, CA (US); Xiaohui Shen, San Jose, CA (US); Chih-Yao Hsieh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 332 days.

(21) Appl. No.: 16/984,992

(22) Filed: Aug. 4, 2020

(65) Prior Publication Data

US 2020/0372622 A1 Nov. 26, 2020

Related U.S. Application Data

(63) Continuation of application No. 15/962,735, filed on Apr. 25, 2018, now Pat. No. 10,783,622.

(51) Int. Cl.
| | | |
|---|---|---|
| *G06T 5/50* | (2006.01) |
| *G06K 9/00* | (2022.01) |
| *G06K 9/62* | (2022.01) |
| *G03B 7/00* | (2021.01) |

(52) U.S. Cl.
CPC ............ *G06T 5/50* (2013.01); *G06T 2200/21* (2013.01); *G06T 2207/10004* (2013.01); *G06T 2207/20081* (2013.01); *G06T 2207/20084* (2013.01)

(58) Field of Classification Search
USPC .................................................. 382/157, 167
See application file for complete search history.

(56) References Cited

U.S. PATENT DOCUMENTS

| | | | |
|---|---|---|---|
| 7,702,131 B2 | 4/2010 | Chinen et al. | |
| 8,228,400 B2 * | 7/2012 | Liu | H04N 5/235 |
| | | | 348/239 |
| 9,836,831 B1 * | 12/2017 | Krishnaswamy | G06T 7/269 |

(Continued)

OTHER PUBLICATIONS

Apple Store App Store Preview—App titled: "Slow Shutter Cam" https://itunes.apple.com/us/app/slow-shutter-cam/id357404131?mt=8Solution, version 1.7 dated May 4, 2011.

(Continued)

*Primary Examiner* — Kathleen Y Dulaney
(74) *Attorney, Agent, or Firm* — Keller Preece PLLC

(57) ABSTRACT

The present disclosure relates to training and utilizing an image exposure transformation network to generate a long-exposure image from a single short-exposure image (e.g., still image). In various embodiments, the image exposure transformation network is trained using adversarial learning, long-exposure ground truth images, and a multi-term loss function. In some embodiments, the image exposure transformation network includes an optical flow prediction network and/or an appearance guided attention network. Trained embodiments of the image exposure transformation network generate realistic long-exposure images from single short-exposure images without additional information.

20 Claims, 20 Drawing Sheets

(56) References Cited

U.S. PATENT DOCUMENTS

| | | |
|---|---|---|
| 2009/0208062 A1 | 8/2009 | Sorek et al. |
| 2019/0130545 A1* | 5/2019 | Cardei .................. G06V 10/993 |
| 2020/0151858 A1* | 5/2020 | Cai ........................... G06T 5/50 |

OTHER PUBLICATIONS

Peterson, J. "Take Long Exposure Photos on Your iPhone in iOS 11," https://ios.gadgethacks.com/how-to/take-long-exposure-photos-your-iphone-ios-11-0177938/ dated Sep. 19, 2017.

Rosebrock, A., "Long exposure with OpenCV and Python," http://www.pyimagesearch.com/2017/08/14/long-exposure-with-opencv-and-python/ dated Aug. 14, 2017.

C. Barnes, E. Shechtman, A. Finkelstein, and D. B. Goldman. Patchmatch: A randomized correspondence algorithm for structural image editing. ACM Trans. Graph., 28(3):24-1, 2009.

S. Caelles, K.-K. Maninis, J. Pont-Tuset, L. Leal-Taixe, D. Cremers, and L. Van Gool. One-shot video object segmentation. In CVPR 2017. IEEE, 2017.

Q. Chen, J. Xu, and V. Koltun. Fast image processing with fully-convolutional networks. In IEEE International Conference on Computer Vision, 2017.

J. Cheng, Y.-H. Tsai, S. Wang, and M.-H. Yang. Segflow: Joint learning for video object segmentation and optical flow. In Proceedings of the IEEE Conference on Computer Vision and Pattern Recognition, pp. 686-695, 2017.

A. Dosovitskiy, J. Tobias Springenberg, and T. Brox. Learning to generate chairs with convolutional neural networks. In Proceedings of the IEEE Conference on Computer Vision and Pattern Recognition, pp. 1538-1546, 2015.

H. Fang and M. Zhang. Creatism: A deep-learning photographer capable of creating professional work. arXiv preprint arXiv:1707.03491, 2017.

P. Fischer, A. Dosovitskiy, E. Ilg, P. Hausser, C. Hazirbas, V. Golkov, P. van der Smagt, D. Cremers, and T. Brox. Flownet: Learning optical flow with convolutional networks. arXiv preprint arXiv:1504.06852, 2015.

L. A. Gatys, A. S. Ecker, and M. Bethge. Image style transfer using convolutional neural networks. In Proceedings of the IEEE Conference on Computer Vision and Pattern Recognition, pp. 2414-2423, 2016.

I. Goodfellow, J. Pouget-Abadie, M. Mirza, B. Xu, D.Warde-Farley, S. Ozair, A. Courville, and Y. Bengio. Generative adversarial nets. In Advances in neural information processing systems, pp. 2672-2680, 2014.

Y. Hu, H. He, C. Xu, B. Wang, and S. Lin. Exposure: A white-box photo post-processing framework. arXiv preprint arXiv:1709.09602, 2017.

A. Ignatov, N. Kobyshev, R. Timofte, K. Vanhoey, and L. Van Gool. Wespe: Weakly supervised photo enhancer for digital cameras. arXiv preprint arXiv:1709.01118, 2017.

A. Ignatov, N. Kobyshev, K. Vanhoey, R. Timofte, and L. Van Gool. Dslr-quality photos on mobile devices with deep convolutional networks. arXiv preprint arXiv:1704.02470, 2017.

P. Isola, J.-Y. Zhu, T. Zhou, and A. A. Efros. Image-to-image translation with conditional adversarial networks. arXiv preprint arXiv:1611.07004, 2016.

J. Johnson, A. Alahi, and L. Fei-Fei. Perceptual losses for real-time style transfer and super-resolution. In European Conference on Computer Vision, pp. 694-711. Springer, 2016.

A. Levin, D. Lischinski, and Y. Weiss. Colorization using optimization. In ACM transactions on graphics (tog), vol. 23, pp. 689-694. ACM, 2004.

C. Li and M. Wand. Precomputed real-time texture synthesis with markovian generative adversarial networks. In European Conference on Computer Vision, pp. 702-716. Springer, 2016.

S. Liu, J. Pan, and M.-H. Yang. Learning recursive filters for low-level vision via a hybrid neural network. In European Conference on Computer Vision, pp. 560-576. Springer, 2016.

A. v. d. Oord, N. Kalchbrenner, and K. Kavukcuoglu. Pixel recurrent neural networks. arXiv preprint arXiv:1601.06759, 2016.

D. Pathak, P. Krahenbuhl, J. Donahue, T. Darrell, and A. A. Efros. Context encoders: Feature Tearning by inpainting. In Proceedings of the IEEE Conference on Computer Vision and Pattern Recognition, pp. 2536-2544, 2016.

A. Radford, L. Metz, and S. Chintala. Unsupervised representation learning with deep convolutional generative adversarial networks. arXiv preprint arXiv:1511.06434, 2015.

J. Revaud, P. Weinzaepfel, Z. Harchaoui, and C. Schmid. Epicflow: Edge-preserving interpolation of correspondences for optical flow. In Proceedings of the IEEE Conference on Computer Vision and Pattern Recognition, pp. 1164-1172, 2015.

S. R. Richter, V. Vineet, S. Roth, and V. Koltun. Playing for data: Ground truth from computer games. In European Conference on Computer Vision, pp. 102-118. Springer, 2016.

0. Ronneberger, p. Fischer, and T. Brox. U-net: Convolutional networks for biomedical image segmentation. In International Conference on Medical Image Computing and Computer-Assisted Intervention, pp. 234-241. Springer, 2015.

K. Simonyan and A. Zisserman. Two-stream convolutional networks for action recognition in videos. In Advances in neural information processing systems, pp. 568-576, 2014.

R. Szeliski. Computer vision: algorithms and applications. Springer Science & Business Media, 2010.

Y.-H. Tsai, M.-H. Yang, and M. J. Black. Video segmentation via object flow. In Proceedings of the IEEE Conference on Computer Vision and Pattern Recognition, pp. 3899-3908, 2016.

Z. Wang, A. C. Bovik, H. R. Sheikh, and E. P. Simoncelli. Image quality assessment: from error visibility to structural similarity. IEEE transactions on image processing, 13(4):600-612, 2004.

P. Weinzaepfel, J. Revaud, Z. Harchaoui, and C. Schmid. Deepflow: Large displacement optical flow with deep matching. In Proceedings of the IEEE International Conference on Computer Vision, pp. 1385-1392, 2013.

X. Yan, J. Yang, K. Sohn, and H. Lee. Attribute2image: Conditional image generation from visual attributes. In European Conference on Computer Vision, pp. 776-791. Springer, 2016.

D. Yoo, N. Kim, S. Park, A. S. Paek, and I. S. Kweon. Pixel-level domain transfer. In European Conference on Computer Vision, pp. 517-532. Springer, 2016.

Y. Zhou and T. L. Berg. Learning temporal transformations from time-lapse videos. In European Conference on Computer Vision, pp. 262-277. Springer, 2016.

J.-Y. Zhu, P. Krahenbuhl, E. Shechtman, and A. A. Efros. Generative visual manipulation on the natural image manifold. In European Conference on Computer Vision, pp. 597-613. Springer, 2016.

J.-Y. Zhu, T. Park, P. Isola, and A. A. Efros. Unpaired imageto—image translation using cycle-consistent adversarial networks. arXiv preprint arXiv:1703-10593, 2017.

U.S. Appl. No. 15/962,735, Feb. 24, 2020, Office Action.

U.S. Appl. No. 15/962,735, May 5, 2020, Notice of Allowance.

\* cited by examiner

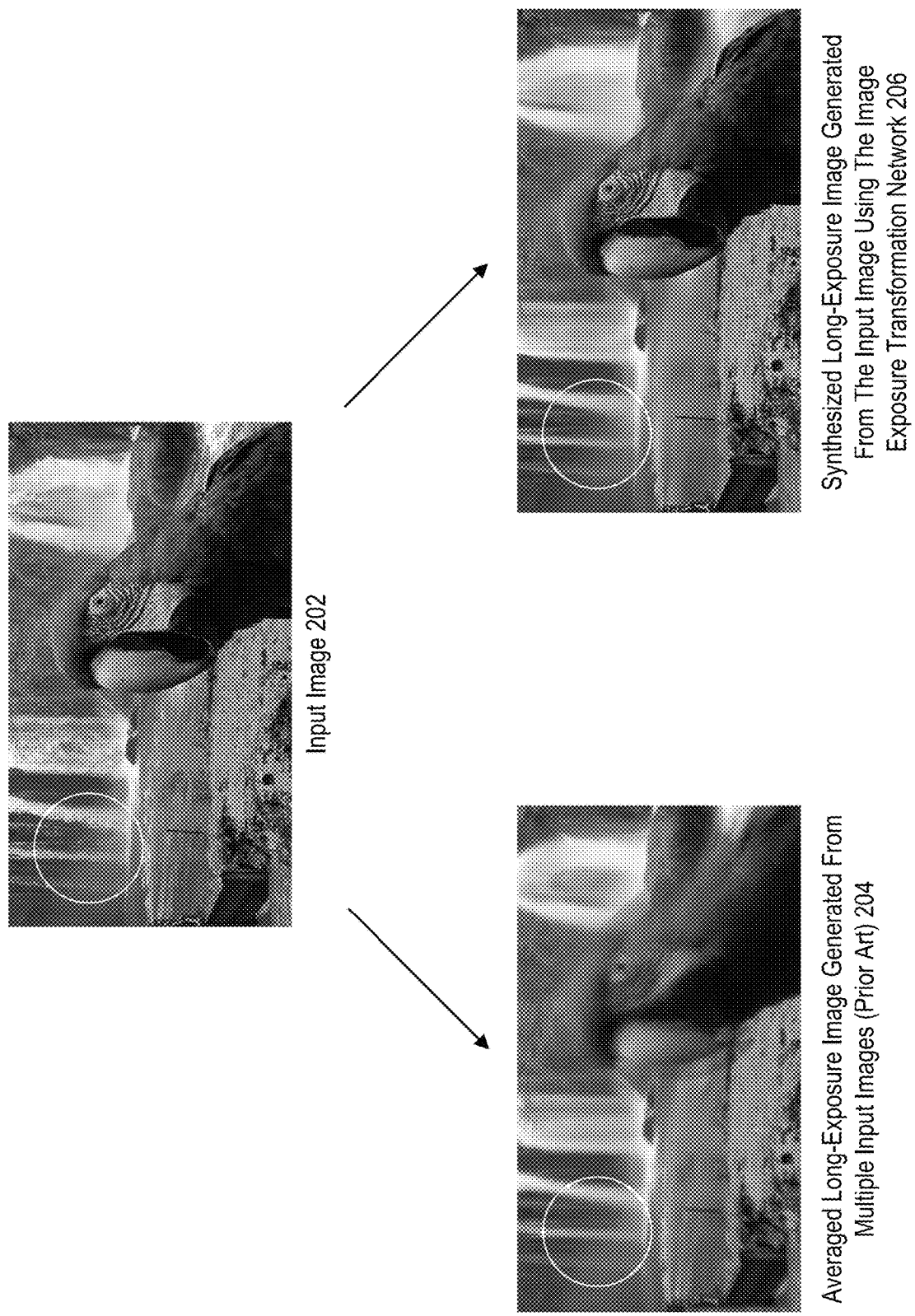

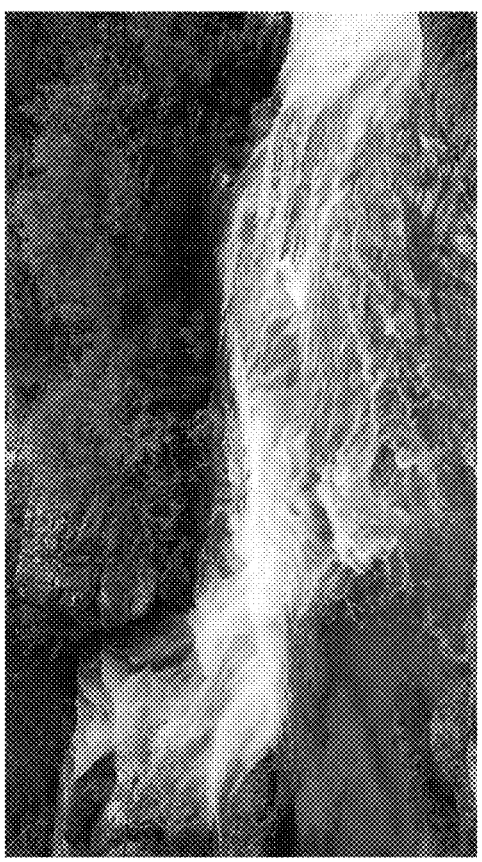
Fig. 3B

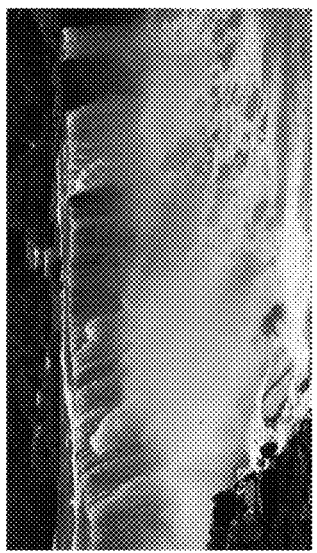
Fig. 4B

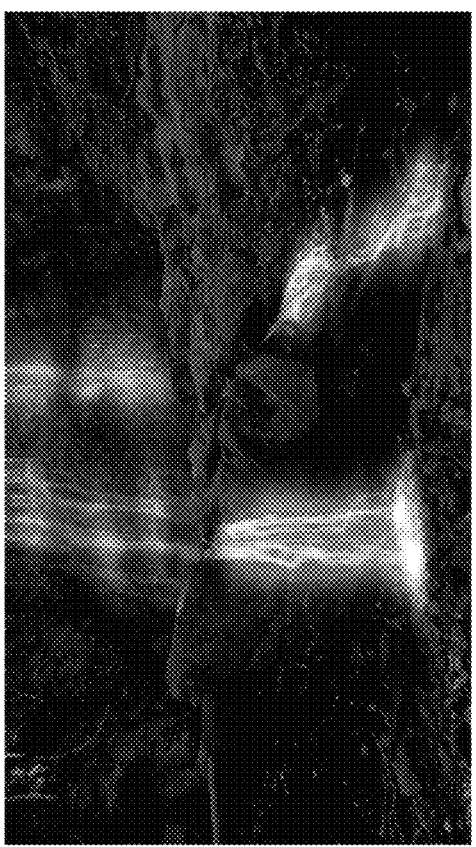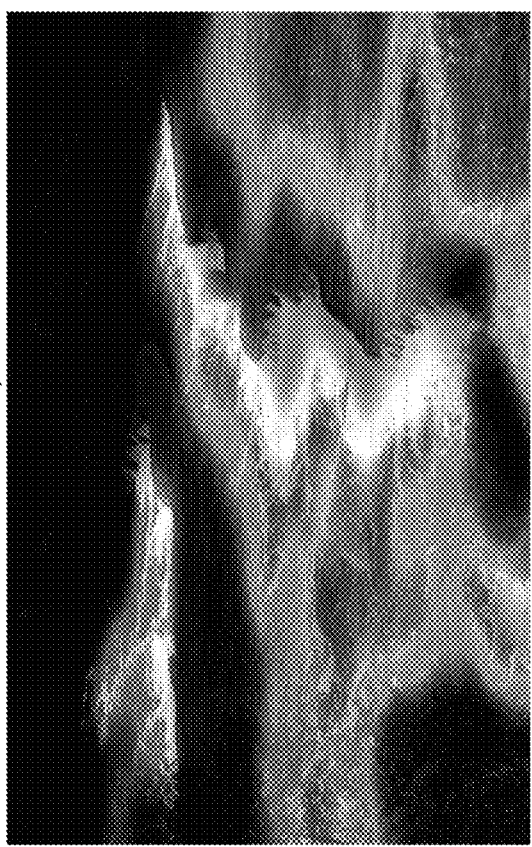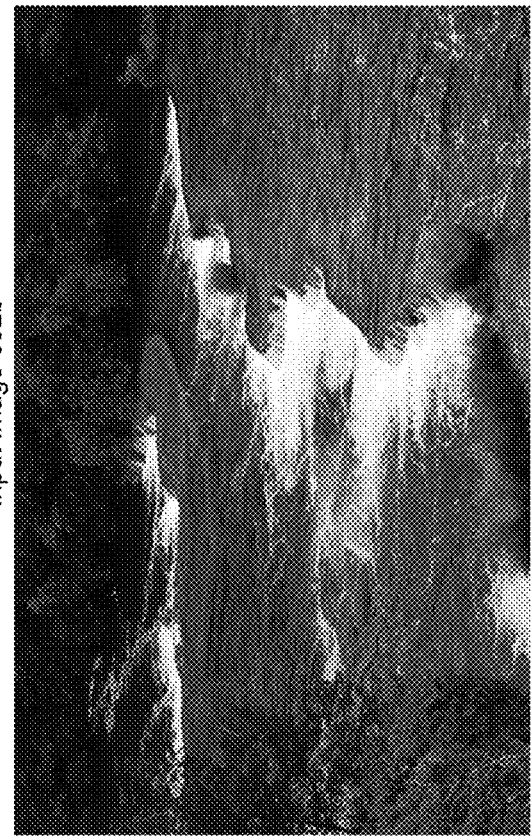
Fig. 6C

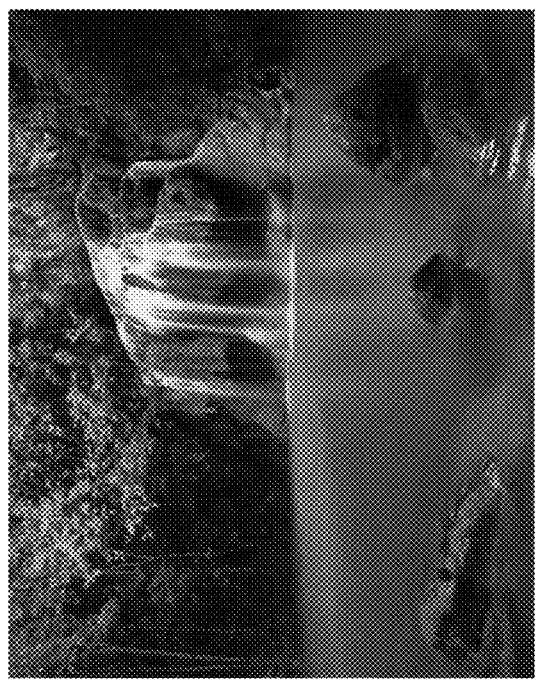
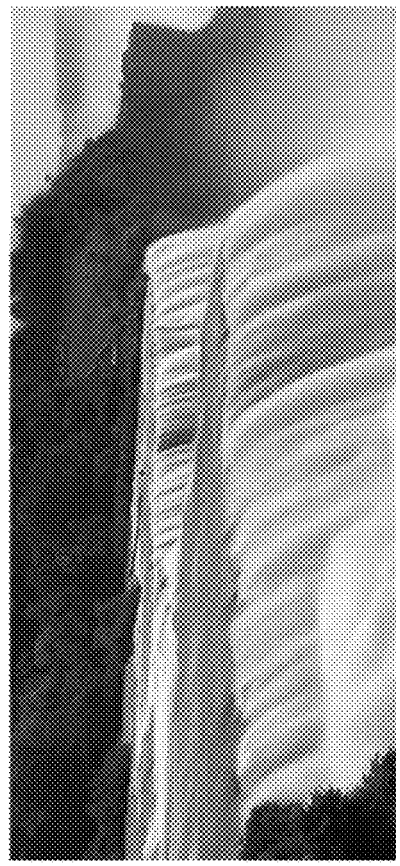
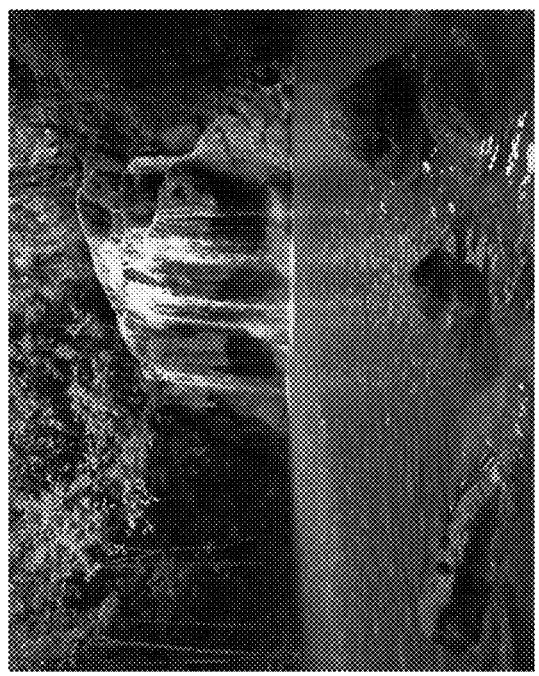
Fig. 8B

UTILIZING AN IMAGE EXPOSURE TRANSFORMATION NEURAL NETWORK TO GENERATE A LONG-EXPOSURE IMAGE FROM A SINGLE SHORT-EXPOSURE IMAGE

CROSS-REFERENCE TO RELATED APPLICATIONS

The present application is a continuation of U.S. application Ser. No. 15/962,735, filed on Apr. 25, 2018. The aforementioned application is hereby incorporated by reference in its entirety.

BACKGROUND

Recent years have witnessed a significant increase in digital photography, particularly with the improvements and availability of digital cameras on mobile devices. Indeed, both hardware and software advances allow for incorporation of digital cameras within a large number of mobile computing devices, such as tablets, smartphones, and wearable devices. As a result, individuals have greater ability than ever before to capture photographs at a moment's notice.

Notwithstanding these improvements, mobile devices are lacking in some areas of digital photography, particularly with respect to artistic photography. For example, mobile devices often perform poorly when capturing long-exposure photographs. In particular, mobile devices often lack the physical components (e.g., lenses, advanced sensors, and additional hardware) needed to capture clean, high-quality long-exposure photographs, such as those on professional-grade cameras (e.g., DSLR cameras). In addition, many parameters and settings for capturing long-exposure photographs, such as changing the ISO, shutter speed, or aperture, are limited or unavailable on many mobile devices.

Some mobile devices offer features to capture long-exposure photographs. However, when using these features, individuals largely find their long-exposure photographs blurry and unsatisfactory. Indeed, the slightest hand movement of the mobile device during a long-exposure capture can distort the photograph. Thus, to achieve an acceptable long-exposure photograph, an individual may have to use additional hardware, such as a tripod and a remote trigger. Unfortunately, this additional equipment is bulky, expensive, and often inaccessible to individuals when photograph opportunities arise.

To overcome these issues, some conventional systems have attempted to create long-exposure photographs on mobile devices from still photographs. These conventional systems require an individual to capture a video that includes a sequence of images (e.g., a live or animated photo). Based on the sequence of images, these systems create a long-exposure photograph. In many instances, these conventional systems still require an individual to use a tripod while capturing the video to obtain satisfactory results.

A primary drawback of these systems is that resulting long-exposure photographs are less realistic due to noticeable artifacts and relatively low resolutions. For example, these systems overlook finer-levels of image semantic information when creating a long-exposure photograph, which causes the long-exposure photograph to include unnatural pixel movements and textures. Further, due to the low resolutions, long-exposure photographs are not scalable, which greatly limit an individual's ability to use the long-exposure photographs in other applications.

As another significant drawback of conventional systems, these systems typically cannot create long-exposure photographs from previously captured photographs because they create long-exposure photographs from videos. Indeed, these conventional systems are unable to create a long-exposure photograph from an existing or stored short-exposure photograph.

These along with additional problems and issues exist with regard to generating realistic long-exposure photographs on mobile computing devices.

BRIEF SUMMARY

Embodiments of the present disclosure provide benefits and/or solve one or more of the foregoing or other problems in the art with systems, non-transitory computer-readable media, and methods for generating and utilizing an image exposure transformation network to generate a long-exposure image from a single short-exposure image. For instance, the disclosed systems can utilize an image exposure transformation network to generate a long-exposure image from a short-exposure image. More particularly, the disclosed systems automatically determine relevant semantic regions of a short-exposure image and accurately transform the exposure of those regions to generate a realistic long-exposure image.

The disclosed systems can train an image exposure transformation network, which can include an image exposure generator neural network that learns to generate synthesized long-exposure images and an adversarial discriminator neural network that learns to distinguish realistic and non-realistic long-exposure images. To further illustrate, in one or more embodiments, the disclosed systems obtain image exposure training pairs of short-exposure training images and long-exposure training images (e.g., a training ground truth). The disclosed systems provide short-exposure training images to the generator neural network, which synthesizes long-exposure images. The synthesized long-exposure images are then provided to the discriminator neural network to determine whether a synthesized long-exposure image appears realistic.

Using the output of the discriminator neural network, a corresponding long-exposure training image, and a multi-term loss function (that measures residual loss, perceptual loss, and texture loss), the disclosed systems train the generator neural network to synthesize more realistic long-exposure images. For instance, the generator neural network trains until it produces synthesized long-exposure images that consistently fool an equally-trained discriminator neural network into classifying the synthesized long-exposure image as realistic. Once trained, the image exposure generator neural network can receive a short-exposure target image and generate a realistic synthesized long-exposure image.

In additional embodiments, the disclosed systems jointly train and utilize an optical flow prediction network and/or an appearance guided attention network to further improve synthesized long-exposure images generated by the generator neural network. For example, the optical flow prediction network trains with the image exposure generator neural network and the adversarial discriminator neural network to predict movement and direction of pixels for a short-exposure image (e.g., an optical flow input). In addition, the appearance guided attention network trains with the image exposure generator neural network and the adversarial discriminator neural network to identify exposure transformation regions and magnitudes within a short-exposure image (e.g., an attention map).

While this summary refers to systems for simplicity, the summary also applies to certain disclosed methods and non-transitory computer-readable media. The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 2 illustrates an example synthesized long-exposure image generated by the image exposure transformation network compared to an example long-exposure image generated by a conventional system.

FIG. 3B illustrates a short-exposure training image and a corresponding long-exposure training image in accordance with one or more embodiments.

FIG. 4B illustrates a short-exposure input image, a long-exposure ground truth image, and various long-exposure output images in accordance with one or more embodiments.

FIG. 6C illustrates short-exposure input images and corresponding attention maps in accordance with one or more embodiments.

FIGS. 8A-8B illustrate synthesized long-exposure images generated by a trained image exposure transformation network in accordance with one or more embodiments.

DETAILED DESCRIPTION

Figure 1:
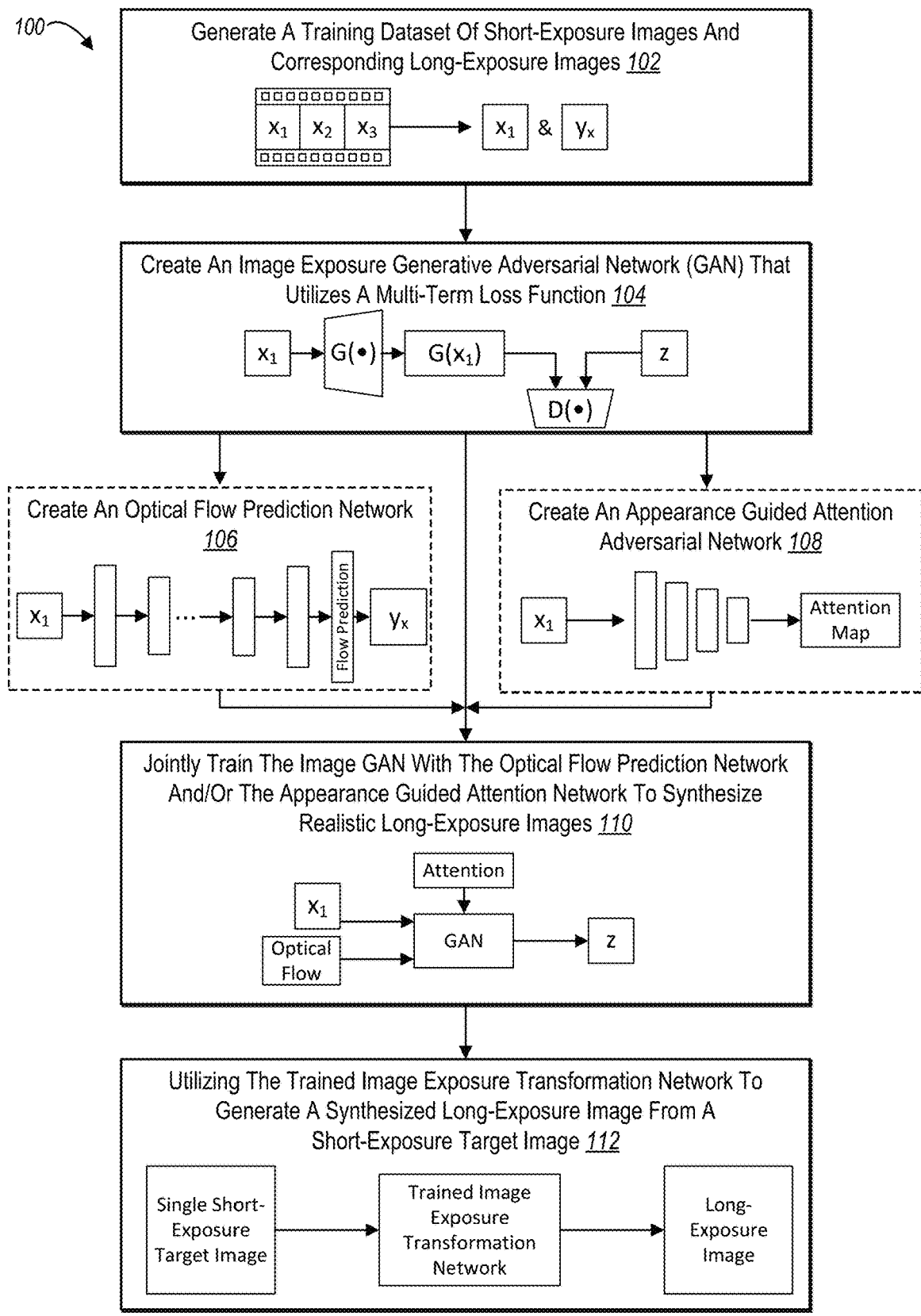
FIG. 1 illustrates a schematic diagram of training and utilizing an image exposure transformation network to generate a long-exposure image from a single short-exposure image in accordance with one or more embodiments.

This disclosure describes one or more embodiments of an image transformation system that trains and utilizes an image exposure transformation network to generate a long-exposure image from a single short-exposure image. In particular, the image transformation system trains the image exposure transformation network using adversarial learning, long-exposure ground truth images, and a multi-term loss function. In some embodiments, the image exposure transformation network includes an optical flow prediction network and/or an appearance guided attention network. Once trained, the image exposure transformation network generates realistic synthesized long-exposure target images from single short-exposure target images (i.e., still images).

To illustrate, in one or more embodiments, the image transformation system constructs an image exposure transformation network that includes an image exposure generative adversarial network (or simply "GAN") having a generator neural network that generates synthesized long-exposure images and a discriminator neural network that distinguishes realistic and non-realistic long-exposure images. In preparing to train the image exposure transformation network, the image transformation system obtains a training dataset of image exposure training pairs, where each image exposure training pair includes a short-exposure training image and a long-exposure ground truth training image.

To train the image exposure transformation network, in one or more embodiments, the image transformation system provides the training dataset to the image exposure transformation network. In particular, the generator neural network generates a synthesized long-exposure image based on a short-exposure training image. The image transformation system then provides the synthesized long-exposure image to the discriminator neural network, which classifies the synthesized long-exposure image as a real or a fake long-exposure image. Using the realness classification of the discriminator neural network, a corresponding long-exposure training image, and a multi-term loss function (that measures residual loss, perceptual loss, and texture loss), the image transformation system trains the image exposure generator neural network to more realistically synthesize long-exposure images, while also training the discriminator neural network to better detect fake (e.g., un-realistic appearing long-exposure images). Moreover, the image transformation system trains the generator neural network until it produces synthesized long-exposure images that consistently fool an equally-trained discriminator neural network into classifying the synthesized long-exposure images as real.

As mentioned above, the image transformation system employs a multi-term loss function to train the image exposure transformation network. In one or more embodiments, the multi-term loss function includes residual loss, perceptual loss, total variance loss, and texture loss. For example, the image transformation system measures residual loss by comparing a synthesized long-exposure image to a ground truth (e.g., a long-exposure training image corresponding to the short-exposure training image input to the generator neural network). In addition, the image transformation system measures perceptual loss by comparing feature representations between the synthesized long-exposure image and the ground truth. Further, the image transformation system measures texture loss based on minimizing cross-entropy of gradients between the synthesized long-exposure image and the ground truth. In some embodiments, the image transformation system applies different weights to each of the losses in the multi-term loss function.

In additional embodiments, the image exposure transformation network includes an optical flow prediction network. The optical flow prediction network can predict optical flow input (i.e., an optical flow prediction) for a short-exposure training image during training and a short-exposure target image after training. Generally, the optical flow prediction for a short-exposure image predicts motion influences (e.g., the movement and direction) of pixels of a subject object needed to realistically transform the short-exposure image into a long-exposure image (e.g., by generating texture simulating the long-exposure effect). Indeed, the GAN can employ the optical input flow to identify one or more pixels to transform when synthesizing a long-exposure image. In some embodiments, the image transformation system trains the optical flow prediction network using a flow loss function and a ground truth optical flow, which is generated from a long-exposure training image. Further, the image transformation system can jointly train the optical flow prediction network and the GAN to fine-tune their respective weights and parameters to collectively generate realistic long-exposure images.

In additional embodiments, or in alternative embodiments, the image exposure transformation network also includes an appearance guided attention network. The appearance guided attention network can generate an attention map for each short-exposure training image. The attention map predicts features and regions within the short-exposure training image to which to apply long-exposure effects. Generally, the attention map provides a spatial context of a short-exposure image by indicating an amount or magnitude of the long-exposure effects to apply to each region and/or feature. In some embodiments, the image transformation system jointly trains the appearance guided attention network with the GAN (e.g., the generator neural network and the discriminator neural network) using the same multi-term loss function.

Figure 3A:
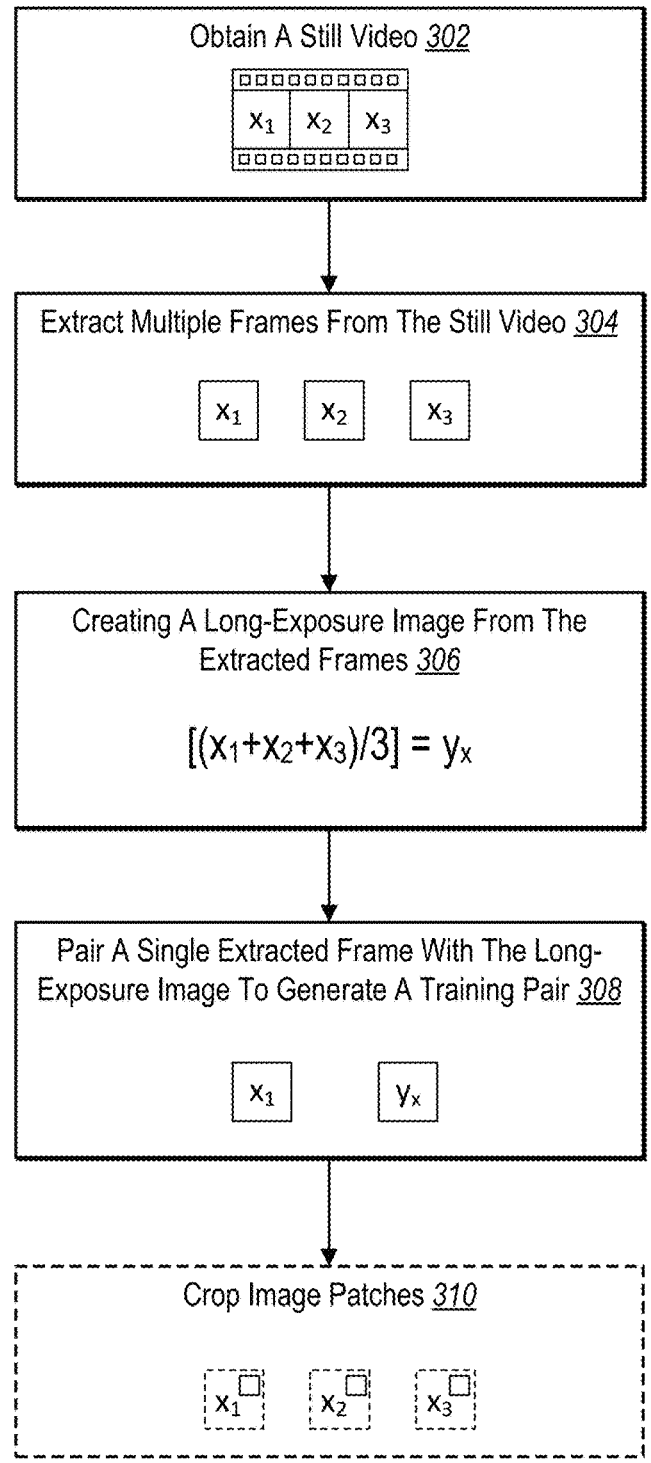
FIG. 3A illustrates a process of generating a training dataset of image exposure training pairs that include short-exposure training images and corresponding long-exposure training images in accordance with one or more embodiments.

As mentioned above, the image transformation system obtains image exposure training pairs that each includes a short-exposure training image and a long-exposure training image (e.g., ground truth). In one or more embodiments, the image transformation system generates one or more image exposure training pairs in a training dataset. For example, and as described further in connection with FIG. 3A, the image transformation system generates image exposure training pairs from a still video (e.g., a video with a static background and a moving subject object). Alternatively, the image transformation system obtains pre-generated image exposure training pairs.

Once trained, the image exposure generator neural network can receive a short-exposure image and generate a synthetic long-exposure image. For example, in one or more embodiments, the image transformation system provides a short-exposure target image to the trained image exposure transformation network, which synthesizes a realistic long-exposure image using the generator neural network. The short-exposure image can be an image captured live by a user's client device or a stored image. Alternatively, the short-exposure image is an analog image (e.g., a photograph or a negative) converted into digital form.

In additional embodiments, the trained image exposure transformation network includes a trained optical flow prediction network in addition to the trained generator neural network. In these embodiments, the trained optical flow prediction network generates the optical flow prediction from the short-exposure images. Indeed, the image transformation system automatically generates the optical flow prediction from a short-exposure target image without additional information (e.g., labels, tags, or flows). The trained generator neural network can utilize the optical flow prediction when generating the synthesized long-exposure image. As a result, the trained image exposure transformation network can generate accurate synthetic long-exposure images with realistic subject object movement from single short-exposure target images based on the optical flow prediction.

In embodiments where the trained image exposure transformation network includes a trained appearance guided attention network, the trained appearance guided attention network generates an attention map for the short-exposure target image. The trained generator neural network can use the attention map to apply specified attention weights to corresponding regions when generating the synthesized long-exposure image. In additional embodiments, the image transformation system receives user input modifying the exposure magnitude (i.e., attention weights) within a region of the attention map, which results in more or fewer exposure transformations to the selected region.

As previously mentioned, the image transformation system provides numerous advantages and benefits over current state of the art and conventional systems. As an example, the image transformation system automatically generates a synthesized long-exposure image from a single short-exposure image using a user's mobile client device. More particularly, the image transformation system generates natural and realistic looking synthesized long-exposure images without requiring users to use a professional camera or purchase additional equipment and accessories for their mobile client device, such as a tripod and or a remote trigger.

In addition, because the image transformation system generates synthesized long-exposure images from single short-exposure images rather than a video (e.g., a sequence of images), the resulting synthesized long-exposure images have clean, crisp, and sharp backgrounds. As a result, the image transformation system outperforms conventional systems with respect to long-exposure image transformations. Indeed, as further described and shown below in relations to FIG. 11, the image transformation system outperforms conventional systems in both qualitative and quantitative head-to-head evaluations with respect to long-exposure image transformations.

The image transformation system also improves flexibility over conventional systems. As mentioned above, the image transformation system can generate synthesized long-exposure images of still images captured in real-time as well as older stored images (e.g., older photographs). Thus, users are not limited to real-time or recent image captures requiring a sequence of images but can employ the image transformation system with a range of short-exposure images.

As another advantage, the image transformation system requires less storage and computational resources than conventional systems. For example, the image transformation system employs simple and direct formulations that yield more realistic synthesized long-exposure images. In addition, unlike conventional systems, the image transformation system disclosed herein scales seamlessly to higher resolutions. Indeed, the image transformation system outputs a high-quality synthesized long-exposure image having the same resolution as an input image regardless of the resolution of the training images used to train the image exposure transformation network.

Moreover, the image transformation system improves efficiency and maximizes the processing capabilities of current mobile client devices, enabling mobile client devices to achieve results not previously possible. Indeed, the image transformation system solves the technical problem of automatically determining relevant semantic regions of a short-exposure image and accurately transforming the long-exposure effect of those regions to generate a realistic synthesized long-exposure image. Further, the image transformation system (e.g., the trained image exposure transformation network) is compact in size and can easily operate on the majority of current mobile client devices.

Additional advantages and benefits of the image transformation system will become apparent in view of the following description. Further, as illustrated by the foregoing discussion, the present disclosure utilizes a variety of terms to describe features and advantages of the image transformation system. Before describing the image transformation system with reference to figures below, additional detail is now provided regarding the meaning of such terms.

As used herein, the term "image" or "digital image" refers to a digital graphics file that when rendered displays one or more objects. In particular, the term "image" can comprise a digital file that includes one or more subject objects and/or background scenery. In addition, images can include a short-exposure image and a long-exposure image. A short-exposure image includes a still image where a camera quickly captures a scene (as a function of shutter speed, lens aperture, and scene luminance). In a short-exposure image, the one or more subject objects and/or the background scenery will appear static. A long-exposure image includes an image where a camera captures multiple instances of light. In a long-exposure image, the one or more subject objects will appear in a moving or flowing state while the background scenery appears unchanged. In some embodiments, a long-exposure image includes a camera capturing a series of images with brief shutter cycles and layering the series of photographs into a single long-exposure image.

As part of training an image exposure transformation network, the image transformation system can employ image exposure training pairs from a training dataset. As used herein, the term "image exposure training pairs" (or simply "training pairs") refers to a short-exposure training image and a corresponding long-exposure training image, which serves as a ground truth during training (e.g., a long-exposure ground truth training image). For example, the image transformation system can train the image exposure transformation network by generating a synthesized long-exposure image from a short-exposure training image in a training pair and comparing the synthesized long-exposure image to the long-exposure training image in the training pair. As used herein, the terms "synthesized long-exposure image" or "generated long-exposure image" refer to a long-exposure image generated utilizing the image exposure transformation network.

As mentioned above, the image transformation system employs machine learning and various neural networks in various embodiments. The term "machine learning," as used herein, refers to the process of constructing and implementing algorithms that can learn from and make predictions on data. In general, machine learning may operate by building models from example inputs, such as image exposure training pairs within a training dataset of images, to make data-driven predictions or decisions. Machine learning can include neural networks (e.g., the image exposure transformation network, image exposure generative adversarial network ("GAN"), generator neural network, discriminator neural network, appearance guided attention network, and optical flow prediction network), data-based models, or a combination of networks and models.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network.

In addition, in one or more embodiments, the term neural network can include deep convolutional neural networks (i.e., "CNNs"), or other types of deep neural networks. The description and figures below generally refer to a CNN, which includes lower layers (e.g., convolutional, deconvolutional, and pooling layers), higher layers (e.g., fully-connected layers), and loss layers.

In addition, the term "image exposure transformation network" refers to a neural network trained to generate a long-exposure image from a short-exposure image. In one or more embodiments, an image exposure transformation network includes an image exposure generative adversarial network ("GAN"). The GAN employs adversarial learning to generate realistic synthesized long-exposure images. In particular, the GAN includes an image exposure generator neural network ("generator neural network") that a learns to generate a synthesized long-exposure image from a single long-exposure image and a corresponding optical input flow, and in some cases, an attention map. The GAN also includes an adversarial discriminator neural network ("discriminator neural network") that learns to distinguish realistic long-exposure images from non-realistic long-exposure images.

As used herein, the term "adversarial learning" refers to a machine-learning algorithm (e.g., the GAN) where opposing learning models are learned together. In particular, the term "adversarial learning" includes solving a plurality of learning tasks in the same model (e.g., in sequence or in parallel) while utilizing the roles and constraints across the tasks. In some embodiments, adversarial learning includes minimizing total loss between one or more loss terms, as further described below.

As mentioned above, the image exposure transformation network employs a loss layer that optionally includes a multi-term loss function, which the image transformation system can use to train the image exposure transformation network. As used herein, the term "loss function" or "loss model" refers to a function that indicates training loss. In some embodiments, a machine-learning algorithm can repetitively train to minimize total overall loss. For example, the loss function determines a partial or total amount of loss with respect to generating a synthesized long-exposure image for a short-exposure training image compared to a corresponding long-exposure image (e.g., a ground truth). The loss function then provides feedback, which is back propagated, to one or more layers of the image exposure transformation network to tune/fine-tune those layers. Examples of loss functions include a cross-entropy loss, a residual loss function, a perceptual loss function, a total variance loss function, a texture loss function, a hinge loss function, and a least squares loss function.

As mentioned above, the image transformation system can employ a multi-term loss function. The multi-term loss function can include loss terms for residual loss, perceptual loss, total variance loss, and/or texture loss. In one or more embodiments, the image transformation system measures residual loss by comparing a short-exposure training image and the synthesized long-exposure image to a long-exposure ground truth training image. In addition, the image transformation system measures perceptual loss by comparing feature representations between the synthesized long-exposure image and the long-exposure ground truth training image. Further, the image transformation system measures texture loss based on minimizing cross-entropy of gradients between the synthesized long-exposure image and the long-exposure ground truth training image. In some embodiments, the image transformation system applies different weights to each of the losses in the multi-term loss function.

In one or more embodiments, the image exposure transformation system includes an optical flow prediction network that predicts the optical flow prediction for a short-exposure image. As used herein, the term "optical flow prediction network" refers to a neural network that is trained using a flow loss function and a ground truth flow to predict the optical flow prediction (e.g., the optical flow input) for a short-exposure image. For example, in one or more embodiments, the image transformation system trains the optical flow prediction network using the flow loss function by comparing the endpoint error (EPE) of pixels between the optical flow prediction for a short-exposure training image and a ground truth flow (e.g., derived from a corresponding long-exposure training image).

As used herein, the terms "optical flow prediction" or "optical flow input" refers to motion influences of pixels needed to realistically transform the short-exposure image into a long-exposure image. In particular, the optical flow prediction includes data related to the movement and direction of pixels in a short-exposure image needed to produce a simulated texture simulating the long-exposure effect.

In additional embodiments, the image exposure transformation network includes an appearance guided attention network that provides an attention map to the generator neural network generated from a short-exposure image. As used herein, the term "appearance guided attention network" refers to a neural network that is trained to predict a spatial context of a short-exposure image. The appearance guided attention network provides a spatial context prediction to the generator neural network in the form of an attention map, which includes weighted parameters (i.e., attention weights) corresponding to long-exposure effects within one or more regions of the short-exposure image. Indeed, the appearance guided attention network trains to predict an attention map that indicates which regions of a short-exposure image should be transformed using long-exposure effects, and to what extent.

As used herein, joint training (or joint learning) refers to tuning parameters of multiple learning models together. In particular, joint training (or learning) includes solving a plurality of learning tasks at the same time while utilizing the roles and constraints across the tasks. For example, the image transformation system can employ joint learning to iteratively or simultaneously train and tune weights and parameters of the various neural network. In some embodiments, joint training includes alternating training back and forth between neural networks within the image exposure transformation network and/or changing the learning rates, as described further below.

Referring now to the figures, FIG. 1 provides an overview of training and utilizing an image exposure transformation network to generate a long-exposure image from a single short-exposure image in accordance with one or more embodiments. In particular, FIG. 1 illustrates a series of acts 100. As shown, the image transformation system performs an act 102 of generating a training dataset of short-exposure images and corresponding long-exposure images. For instance, the image transformation system generates training pairs, where each pair includes a short-exposure image (shown as "$x_i$") and a corresponding long-exposure image (shown as "$y_x$"), which serves as a ground truth during training. In one or more embodiments, the image transformation system generates the training pairs based on a still video. Additional detail regarding generating a training database of training pairs is provided below in connection with FIG. 2.

In alternative embodiments, the image transformation system obtains a previously generated training dataset of training images. For example, the image transformation system locally accesses the previously generated training dataset. In another example, the image transformation system receives the training dataset from a third-party or remote source.

As shown in FIG. 1, the image transformation system performs an act 104 of creating an image exposure generative adversarial network ("GAN") that utilizes a multi-term loss function. As mentioned above, the GAN includes a generator neural network (shown as "G(•)") and a discriminator neural network (shown as "D(•)"). The generator neural network generates a synthesized long-exposure image (shown as "$G(x_i)$") from a single short-exposure image (shown as "$x_i$"), and the discriminator neural network determines whether the synthesized long-exposure image resembles a real long-exposure image (shown as "z").

In addition, the image transformation system utilizes a multi-term loss function to train the GAN, as described below. For example, the multi-term loss function includes a residual loss term, a perceptual loss term, a texture loss term, and in some cases, a total variance loss term. Further, in some embodiments, the image transformation system individually weights each of the loss terms when utilizing the multi-term loss function. Additional detail regarding creating the GAN and utilizing the multi-term loss function to train the GAN is provided below in connection with FIGS. 4A-4B.

As shown in FIG. 1, the image transformation system optionally performs the act 106 of creating an optical flow prediction network. As mentioned above, the optical flow prediction network identifies pixels in a short-exposure image that will move when transforming the short-exposure image to a long-exposure image. For instance, the optical flow prediction network predicts optical flow input (i.e., an optical flow prediction) that includes the movement and direction of pixels, which the generator neural network uses to generate texture simulating the long-exposure effect. Additional detail regarding the optical flow prediction network and the optical flow prediction is provided in connection with FIGS. 5A-5B below.

Further, the image transformation system optionally performs the act 108 of creating an appearance guided attention network. As mentioned above, the appearance guided attention network generates an attention map for a short-exposure image that indicates regions in the short-exposure image where the generator neural network should apply the long-exposure effect. In addition, the attention map can include attention weights for one or more regions specifying the magnitude of the long-exposure effect to be applied. Additional detail regarding the appearance guided attention network, attention maps, and attention weights is provided in connection with FIGS. 6A-6C below.

As shown in FIG. 1, the image transformation system performs the act 110 of jointly training the GAN with the optical flow prediction network and/or appearance guided attention network. For example, the image transformation system can train the GAN alone when neither the appearance guided attention network nor the optical flow prediction network is created. In another example, the image transformation system alternates training the GAN and the optical flow prediction network using a large learning rate, then simultaneously fine-tunes the GAN and the optical flow prediction network using a small learning rate. In an additional example, the image transformation system jointly trains the GAN and the appearance guided attention network using the multi-term loss function mentioned above. Additional detail regarding training various embodiments of the image exposure transformation network (e.g., the GAN alone or the GAN with the optical flow prediction network and/or appearance guided attention network) is provided in connection with FIGS. 4A, 5A, and 6A below.

As shown, the image transformation system performs the act 112 of utilizing the trained image exposure transformation network to generate a synthesized long-exposure image from a short-exposure target image. For example, the image transformation system provides a short-exposure target image to the trained image exposure transformation network, which employs the generator neural network to generate a synthesized long-exposure image. When included in the trained image exposure transformation network, the trained optical flow prediction network provides the optical flow prediction to the generator neural network, which the generator neural network utilizes to generate the synthesized long-exposure image. Similarly, when included in the trained image exposure transformation network, the appearance guided attention network provides an attention map based on the short-exposure target image to the generator neural network. Additional detail regarding utilizing the trained image exposure transformation network to generate a synthesized long-exposure image from a single short-exposure target image is provided below in connection with FIG. 7.

To illustrate a result of utilizing the trained image exposure transformation network, FIG. 2 shows an example synthesized long-exposure image generated by the image exposure transformation network compared to an example long-exposure image generated by a conventional system. In particular, FIG. 2 includes an input image 202 (e.g., a short-exposure target image) of a scene captured using a handheld mobile device. For example, a user captures the input image 202 using a smartphone or tablet without a tripod or remote trigger. As shown, the input image 202 includes a bird in the foreground and a waterfall (i.e., the subject object) among the background scenery.

In addition, FIG. 2 includes an averaged long-exposure image 204 generated from multiple input images 202. For example, the conventional system averages the multiple images together to generate a long-exposure image. As shown in the averaged long-exposure image 204, the waterfall appears to have a long-exposure effect. However, the bird and the background scenery, which are to remain unchained, also appear to have a long-exposure effect. Indeed, the handheld movement of the user's mobile device has confused the conventional system into applying the long-exposure effect to the entire image. Further, movement by the bird in between frames could likewise confuse the conventional system.

FIG. 2 also includes a synthesized long-exposure image 206 generated from the input image 202 using the image exposure transformation network disclosed herein. As shown, the bird and the background scenery appear sharp while the waterfall has a long-exposure effect. In contrast to the averaged long-exposure image 204, which uses a sequence of images, the image transformation system generates the synthesized long-exposure image 206 from a single short-exposure image (i.e., the input image 202). As such, the image transformation system negates the effects of camera movement that inhibit the conventional system.

Further, the synthesized long-exposure image 206 is the same size and resolution as the input image 202. Often, conventional systems produce long-exposure images that are of lower quality and/or resolution than the input image 202. For example, while the average long-exposure image 204 is the same resolution as the input image 202, the quality is lower as a result of camera motion.

As shown in FIG. 2 and as further described below, the image transformation system avoids motion blur caused by camera motion or subject object motion. Indeed, the image transformation system trains an image exposure transformation network to learn which portions of the input image 202 to apply long-exposure effects to achieve a realistic long-exposure image. Additional examples as well as comparisons to conventional systems are provided in connection with FIGS. 8A-8B, and FIG. 11.

Turning now to FIG. 3, additional detail is provided with respect to generating a training dataset. For example, FIG. 3 illustrates generating a training dataset of training pairs that include short-exposure training images and corresponding long-exposure training images. In particular, FIG. 3 illustrates a series of acts 300 of the image transformation system generating one or more training pairs used to train the image exposure transformation network.

As shown, the image transformation system performs the act 302 of obtaining a still video. A still video includes a sequence of frames capturing movement of one or more subject objects from a fixed camera (e.g., the background scenery is static). For example, the still video captures a scene of clouds or stars moving over a fixed landscape. As another example, the still video captures traffic along a path or road. The still video can be captured from any type of fixed camera ranging from a smartphone on a tripod to a fixed professional video camera.

The image transformation system can obtain the still video from a variety of sources. For example, the image transformation system obtains the still video from a local or third-party stock database. Alternatively, a user captures a variety of still videos. In some embodiments, the still videos relate to the same types of subject object (e.g., water movement). In alternative embodiments, the still videos vary in subject object type and background scenery (e.g., water movement, traffic, clouds, and lights at night).

As shown, the image transformation system performs the act 304 of extracting multiple frames from the still video. For instance, the image transformation system extracts two or more frames. The image transformation system can employ a variety of methods to select which frames to extract from the still video. For example, the image transformation system extracts every frame, every frame within a set period (e.g., three seconds), or each x numbers of frames. In another example, the image transformation system extracts each frame that changes at least a threshold number of pixels from a previously selected frame. Further, the image transformation system can select frames randomly.

Upon extracting multiple frames from the still video, the image transformation system performs the act 306 of creating a long-exposure image from the extracted frames. In particular, the image transformation system creates a long-exposure image to serve as a ground truth using two or more extracted frames. As described below, the image transformation system can employ a variety of methods to create the long-exposure image from the multiple extracted frames.

To illustrate, in one or more embodiments, the image transformation system creates the long-exposure image by averaging the extracted frames together. Because the background in each of the extracted frames does not shift or change, the image transformation system will average only the moving pixels within the images corresponding to the subject object, creating a simulated long-exposure effect of the subject object. In some embodiments, the image transformation system averages all of the extracted frames from a still video. In alternative embodiments, the image transformation system creates the long-exposure image by averaging only a subset of the extracted frames.

As shown in FIG. 3, the image transformation system performs the act 308 of pairing a single extracted frame with the long-exposure image to generate a training pair. As mentioned above, a training pair includes a short-exposure training image and a corresponding long-exposure training image. Thus, the image transformation system creates one or more training pairs (i.e., image exposure training pairs) by matching each extracted frame (or a subset) from the still video with the created long-exposure image. Indeed, the image transformation system can generate multiple training pairs from a single still video.

The image transformation system can repeat the process of creating training pairs for the training dataset using other still videos and/or different portions of the same still video. For example, the image transformation system repeats the acts 302-308 until the training database includes a minimum number of training pairs. In some embodiments, the image transformation system limits the number of training pairs that can be generated from a still video, to ensure diversity among the training data.

In additional embodiments, the image transformation system performs the optional act 310 of cropping image patches from the trained pairs. In particular, the image transformation system crops a portion of an extracted frame from the still video and a corresponding portion of the created long-exposure image (e.g., ground truth image). The image transformation system then creates additional training pair from the cropped images.

Cropping images into smaller dimensions (e.g., 256×256 pixels) provides a number of advantages with respect to training. For example, creating training pairs from cropped images enables the image transformation system to create additional training pairs for the same number of still videos and extracted frames, which in turn provides more training data and results in an increased learning accuracy. In addition, cropping images captures different scenery views within a still video. Indeed, cropping different windows within a still video creates the effect of multiple different still videos, which increases diversity in the training data.

As another advantage, creating training pairs from cropped images enables the image transformation system to improve training. For example, because the cropped training pairs have smaller dimensions, the image transformation system improves efficiency by reducing computational time as well as overall training time. Further, as mentioned above, the image exposure transformation network is scalable, which means that regardless of the image dimensions used to train the image exposure transformation network the image transformation system can generate synthesized long-exposure images having the same dimensions, sharpness, and quality as a corresponding input image (e.g., a short-exposure target image).

FIG. 3B illustrates an example of a training pair. As shown, a training pair includes a single short-exposure training image 312 and a long-exposure image 314, which serves as a ground truth, as further described below. As illustrated, the short-exposure training image 312 captures a still, clean, crisp, and sharp image of the river and background. In addition, the long-exposure image 314 shows the river water having a long-exposure effect, while the background remains the same as in the short-exposure training image 312.

Figure 4A:
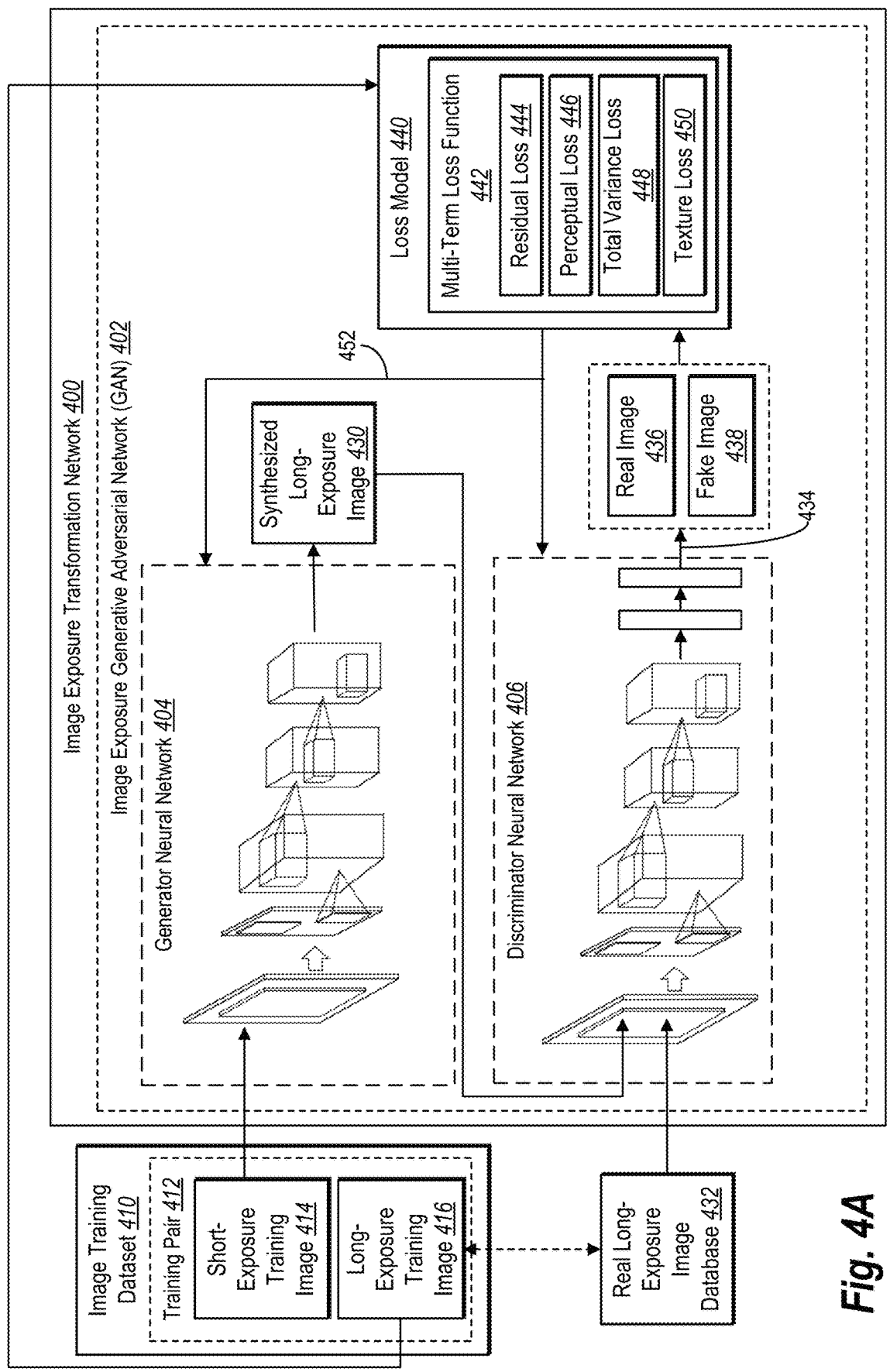
FIG. 4A illustrates a diagram of a process of training an image exposure transformation network that includes a generator neural network and a discriminator neural network using a multi-term loss function in accordance with one or more embodiments.
Figure 5A:
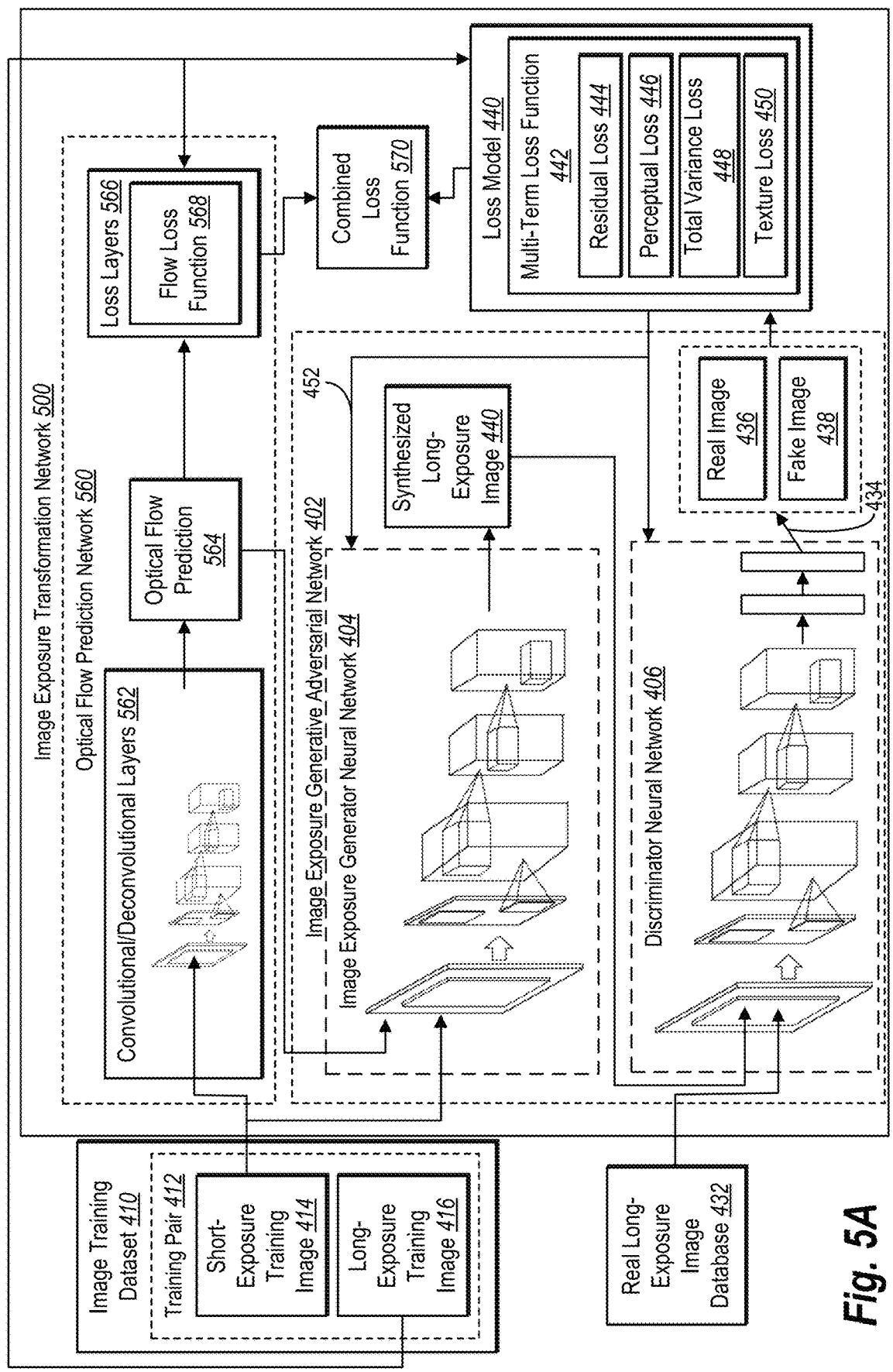
FIGS. 5A-5B illustrate diagrams of training an image exposure transformation network that includes a generator neural network, a discriminator neural network, and an optical flow prediction network in accordance with one or more embodiments.
Figure 5B:
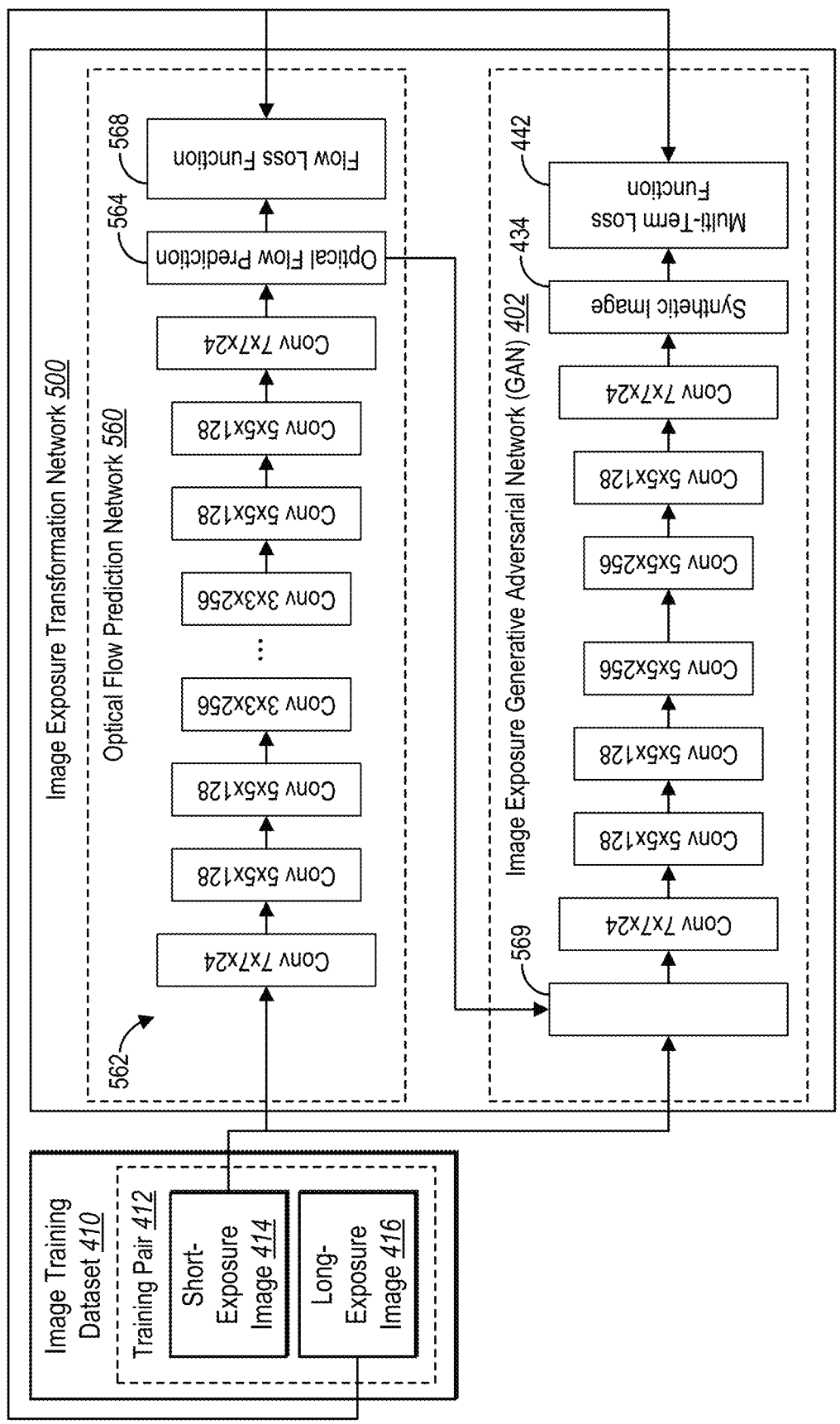
Figure 6A:
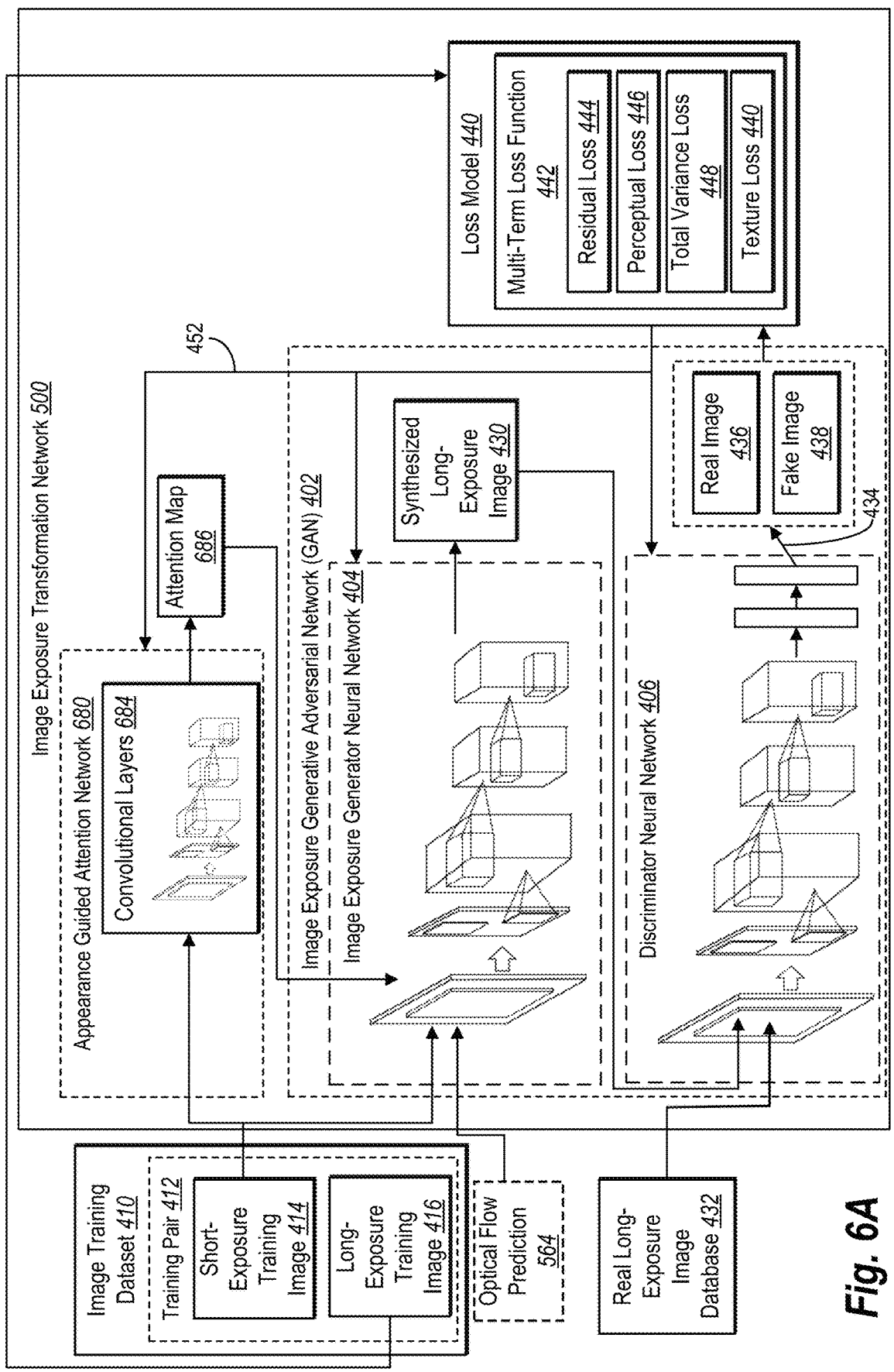
FIG. 6A illustrates a diagram of training an image exposure transformation network that includes an image exposure generator neural network, a discriminator neural network, and an appearance guided attention network in accordance with one or more embodiments.

As mentioned above, the image transformation system uses a training dataset to train an image exposure transformation network. To illustrate, FIGS. 4A-6B shows embodiments of the image transformation system training various image exposure transformation networks. For example, FIG. 4A illustrates an image exposure transformation network having a GAN that trains using a multi-term loss function. FIG. 5A illustrates an image exposure transformation network that includes the GAN and an optical flow prediction network. FIG. 6A illustrates an image exposure transformation network that includes the GAN and an appearance guided attention network.

As mentioned, FIG. 4A illustrates training an image exposure transformation network 400 that includes an image exposure generative adversarial network 402 ("GAN 402") using a multi-term loss function 442. The GAN 402 includes a generator neural network 404 (i.e., an image exposure generator neural network), a discriminator neural network 406 (i.e., an adversarial discriminator neural network), and a loss model 440. In one or more embodiments, the generator neural network 404 and/or the discriminator neural network 406 are convolutional neural networks ("CNNs") having lower neural network layers (e.g., convolutional and deconvolutional layers) and higher neural network layers (e.g., fully-connected layers). In alternative embodiments, the generator neural network 404 and/or the discriminator neural network 406 employ a different neural network architecture.

As mentioned above, the generator neural network 404 synthesizes short-exposure images into synthesized long-exposure images. For instance, the generator neural network 404 utilizes machine learning to tune weights and parameters for generating a realistic synthesized long-exposure image. For example, the generator neural network 404 learns how to apply long-exposure effects to features identified within the short-exposure training image 414. As described further below, the image transformation system trains the generator neural network 404 to generate synthesized long-exposure images from short-exposure training images based on corresponding long-exposure training images (e.g., ground truths).

As also mentioned above, the discriminator neural network 406 determines whether a synthesized long-exposure image appears as a realistic (e.g., authentic) long-exposure image. For instance, the discriminator neural network 406 utilizes machine learning to learn weights and parameters to distinguish realistic long-exposure images from non-realistic long-exposure images based on learned feature representations. In many embodiments, the discriminator neural network 406 is a feed-forward CNN that operates within the gradient domain rather than the image domain. Indeed, compared to the image domain, the gradient domain is more sensitive to changes along sharp edges, which enables the discriminator neural network 406 to better learn and detect features (e.g., feature representations) of real long-exposure images. For example, the discriminator neural network 406 can comprise a number of convolutional layers (e.g., 4) each followed by a LeakyReLU non-linearity and batch normalization.

In one or more embodiments, the image transformation system trains the discriminator neural network 406 using real long-exposure images (e.g., the real long-exposure image database 432 described below), from which the discriminator neural network 406 learns features that characterize authentic and realistic long-exposure images. Further, the image transformation system trains the discriminator neural network 406 using the loss model 440, as described further below.

As just mentioned, the image transformation system can use the real long-exposure image database 432 to train the discriminator neural network 406. In one or more embodiments, the real long-exposure image database 432 includes a set of real long-exposure images captured from fixed cameras that capture light and light reflections over a period of time (e.g., seconds). In some embodiments, the real long-exposure image database 432 includes the long-exposure training images from the image training dataset 410 (shown with the dashed line). Further, the real long-exposure image database 432 can focus on a particular type of subject object and/or scenery (e.g., water movement, traffic, clouds, or lights at night). In alternative embodiments, the real long-exposure image database 432 includes a variety of scenery and captured subject objects.

As mentioned above, the image transformation system can train the GAN 402 using training data. For example, in one or more embodiments, the image transformation system employs an image training dataset 410 to train the generator neural network 404 and the discriminator neural network 406. As shown, the image training dataset 410 includes image exposure training pairs, where each training pair 412 includes a short-exposure training image 414 and a long-exposure training image 416 (e.g., a ground truth). Additional description regarding generating and obtaining image training datasets is provided above in connection with FIGS. 3A-3B.

To illustrate training the GAN 402, the image transformation system provides the short-exposure training image 414 to the generator neural network 404. The generator neural network 404 transforms the short-exposure training image 414 into a synthesized long-exposure image 430. Next, the image transformation system provides the synthesized long-exposure image 430 to the discriminator neural network 406, which determines a prediction 434 whether the synthesized long-exposure image 430 resembles a real image 436 or a fake image 438. The image transformation system then provides the synthesized long-exposure image 430 (e.g., directly or via the discriminator neural network 406) and the prediction 434 of the real/fake image determination to the loss model 440.

The loss model 440 includes the multi-term loss function 442. As shown, the multi-term loss function 442 includes terms corresponding to residual loss 444, perceptual loss 446, total variance loss 448, and texture loss 450. In one or more embodiments, the image transformation system employs the multi-term loss function 442 to overcome the challenge in long-exposure synthesis of preserving the photo-realistic nature of the original photo in a synthesized image. Indeed, long-exposure effects should be applied only to certain semantic image regions of a short-exposure image while still maintaining the local-global content consistency of the short-exposure image. Single loss functions (e.g., pixel error loss or residual loss) alone often fail to maintain the proper image semantics and/or do not consistently apply losses across regions.

As mentioned above, the multi-term loss function 442 includes a term for residual loss 444. In one or more embodiments, residual loss 444 measures and enforces the visual similarity between a synthesized long-exposure image and a ground truth image. For example, the residual loss 444 measures a loss amount by comparing the synthesized long-exposure image 430 to the long-exposure training image 416. The image transformation system provides the residual loss amount to the generator neural network 404 via back propagation, which tunes its weights and parameters to reduce visual differences between a synthesized long-exposure image and the long-exposure training image.

In many embodiments, unlike color square loss or other loss terms, employing the residual loss 444 significantly reduces the value range when computing the residual difference between a long-exposure training image 416 and a short-exposure training image 414 in a training pair 412. Accordingly, the residual loss 444 is better suited for learning long-exposure image transformations than other loss terms (e.g., color square loss) because a reduced value range produces more accurate (e.g., photo-realistic) long-exposure images as well as results in fewer computations and learning iterations during training. An objective function for the residual loss 444 is shown in Equation 2 below.

The multi-term loss function 442 also includes a term for perceptual loss 446. In some embodiments, the image transformation system utilizes perceptual loss 446 to train the generator neural network 404 to generate a synthesized long-exposure image 430 that preserves the original content and perceptual quality of the long-exposure training image 416 (i.e., ground truth). For example, the image transformation system measures a perceptual loss amount by comparing feature representations between the synthesized long-exposure image 430 to the long-exposure training image 416. Indeed, the perceptual loss 446 utilizes the perceptual loss amount to train the generator neural network 404 to maintain feature representation similarity between the synthesized long-exposure image 430 and the long-exposure training image 416. An objective function for the perceptual loss 446 is shown in Equation 3 below.

As shown, the multi-term loss function 442 also includes a term for total variance loss 448. In various embodiments, the total variance loss 448 trains the generator neural network 404 to generate spatial smoothness in the synthesized long-exposure image 430. For example, the image transformation system measures a total variance loss amount by comparing high-level image feature representations extracted from the synthesized long-exposure image 430 and the long-exposure training image 416. An objective function for the total variance loss 448 is shown in Equation 4 below.

Moreover, the multi-term loss function 442 also includes a term for texture loss 450. In one or more embodiments, the image transformation system uses the texture loss 450 to train the discriminator neural network 406 to detect non-realistic long-exposure images by measuring texture quality. As mentioned above, the discriminator neural network 406 operates in the gradient domain, which provides a favorable environment with respect to detecting realistic texture changes. Accordingly, the image transformation system measures a texture loss amount by comparing horizontal and vertical gradients between the synthesized long-exposure image 430 and the long-exposure training image 416.

To illustrate, the image transformation system concatenates the horizontal and vertical gradients of the synthesized long-exposure image 430 and the long-exposure training image 416 (i.e., the ground truth). The image transformation system then uses the texture loss 450 to train the discriminator neural network 406 by minimizing the cross-entropy between the images, which in turn provides feedback to the generator neural network 404 to better model realistic long-exposure effects in the synthesized long-exposure image 430. An objective function for the texture loss 450 is shown in Equation 5 below.

The image transformation system can combine two or more of the loss terms described above to form the multi-term loss function 442. In various embodiments, the image transformation system further weights each of the loss terms within the multi-term loss function 442. For example, image transformation system applies a weight to a first loss term to increase the influence of the first loss term while applying a weight to a second loss term that decreases the influence of the second loss term. In some embodiments, the weights are chosen based on empirical testing and results. In alternative embodiments, the image transformation system automatically determines the weights of the various loss terms. An example of a weighted multi-term loss function 442 is shown in Equation 6 below.

As mentioned above, the image transformation system can utilize one or more loss amounts to train the image exposure transformation network 400. For example, the image transformation system provides the multi-term loss amount (e.g., loss feedback 452) from the multi-term loss function 442 to both the generator neural network 404 and the discriminator neural network 406. The generator neural network 404 uses the loss to tune its weights and parameters to generate more realistic synthesized long-exposure images. Similarly, the discriminator neural network uses the loss to tune its weights and parameters to more accurately detect whether a synthesized long-exposure image 430 is a real image 436 or a fake image 438.

During training, in one or more embodiments, the image transformation system iteratively provides loss feedback 452 to the generator neural network 404 and the discriminator neural network 406. For example, the image transformation system provides x iterations of the loss feedback 452 to the generator neural network 404 before providing y iterations of feedback to the discriminator neural network 406, where x and y are the same or different values). In alternative embodiments, the image transformation system provides the generator neural network 404 with the loss feedback 452 until it generates a synthesized long-exposure image 430 that fools the discriminator neural network 406 (one or more times). Then, the image transformation system provides the discriminator neural network 406 with the loss feedback 452 until it successfully distinguishes the synthesized long-exposure image 430 as a fake image (one or more times).

In various embodiments, the image transformation system trains the image exposure transformation network 400 until the generator neural network 404 and/or the discriminator neural network 406 converge. For example, the image transformation system trains the image exposure transformation network 400 until the loss feedback 452 (e.g., the multi-term loss) satisfies (e.g., equals or falls below) a threshold amount. In some cases, the neural networks converge when any additional change to the weights or parameters of one or more neural networks would increase the overall error loss rather than reduce or maintain the overall error loss.

In additional or alternative embodiments, the image transformation system trains the image exposure transformation network 400 until the discriminator neural network 406 cannot distinguish a synthesized long-exposure image 430 from long-exposure images in the real long-exposure image database 432. Indeed, the image transformation system can stop or suspend training when the generator neural network 404 produces synthesized long-exposure images that consistently fools the discriminator neural network 406 (e.g., a threshold number of times).

Additional detail is now provided with respect to training the image exposure transformation network 400. As mentioned above, in various embodiments, the image transformation system utilizes the multi-term loss function 442 of the loss model 440 to determine one or more loss amounts and train the generator neural network 404 and the discriminator neural network 406. Indeed, the goal of training the GAN 402 is to create a generator neural network 404 that generates synthesized long-exposure images that are indistinguishable from real long-exposure images. Mathematically, this objective can be represented as:

$$\operatorname*{argmin}_{w} \sum_{i=1}^{N} (\mathcal{L}(G_w(I_s^i), I_t^i)) \quad (1)$$

As shown in Equation 1, given a short-exposure image $I_s$ or the short-exposure training image 414) and a ground truth image $I_t$ or the long-exposure training image 416, the goal of the image transformation system is to generate a synthesized long-exposure image 430 that resembles the ground truth, and thus, minimizing the overall loss. Accordingly, the image transformation system trains to learn an underlying image transformation function G with weight w (e.g., the generator neural network 404). In particular, the image transformation system uses training pairs $\{I_s^i, I_t^i\}_{i=1}^{N}$ to minimize the objective function shown in Equation 1 above.

In Equation 1, $\mathcal{L}$ represents the multi-term loss function 442. As mentioned above, the multi-term loss function 442 can include two or more loss terms including residual loss 444, perceptual loss 446, total variance loss 448, and texture loss 450. Equation 2 below provides one example of an objective function for the residual loss 444.

$$\mathcal{L}_{residual} = \sum_i \|G_w(I_s^i) + I_t^i - I_t^i\|_F^2 \quad (2)$$

In Equation 2, $G_W(I_s)+I_s$ refers to the synthesized long-exposure image 430 generated by the generator neural network 404 (e.g., $G_W(\cdot)$) based on the short-exposure training image 414 (e.g., $I_s$). In addition, in Equation 2, F refers to the Frobenius norm.

In one or more embodiments, the multi-term loss function 442 includes the perceptual loss 446. Equation 3 below provides one example of an objective function for the perceptual loss 446.

$$\mathcal{L}_{perceptual} = \frac{1}{C_j H_j W_j} \|\varnothing_j(G_w(I_s) + I_s) - \varnothing_j(I_t)\| \quad (3)$$

As shown in Equation 3, the image transformation system can determine the perceptual loss amount based on measuring the Euclidean distance between the feature representation of the synthesized long-exposure image 430 and the long-exposure training image 416 (e.g., the ground truth). In addition, in Equation 3, $\varnothing_j(\cdot)$ represents a feature map obtained after j convolutional layers of the generator neural network 404. In some embodiments, j can represent up to 19 convolutional layers and the feature map is produced by a rectified linear unit (ReLu), such as ReLu42. Further, in Equation 3, C refers to a number of channels of the produced feature maps, H refers to the height of the produced feature maps, and W refers to the weight of the produced feature maps.

In addition to the perceptual loss 446, in some embodiments, the multi-term loss function 442 can include the total variance loss 448. Equation 4 below provides one example of an objective function for the total variance loss 448. In Equation 4, C, H, and W respectively represent the dimensions of the channels, height, and width of the synthesized long-exposure image 430.

$$\mathcal{L}_{tv} = \frac{1}{CHW} \|\delta_x(G_w(I_s) + I_s) + \delta_y(G_w(I_s) + I_s)\| \quad (4)$$

As mentioned above, the image transformation system can utilize the total variance loss 448 to enhance spatial smoothness in the synthesized long-exposure image 430. In particular, in one or more embodiments, the total variance loss 448 measures a total variance loss amount by comparing high-level image feature representations extracted from the synthesized long-exposure image 430 and the long-exposure training image 416.

Moreover, the multi-term loss function 442 can include the texture loss 450. Equation 5 below provides one example of an objective function for the texture loss 450.

$$\mathcal{L}_{texture} = \log D(\delta(G_W(I_s)+I_s), \delta(I_t)) \quad (5)$$

As shown in Equation 5, $D(\cdot)$ represents the discriminator neural network 406. Further, as with the above Equations, the term "$G_W(I_s)+I_s$" refers to the synthesized long-exposure image 430 generated by the generator neural network 404 (e.g., $G_W(\cdot)$) based on the short-exposure training image 414 (e.g., $I_s$).

As also mentioned above, the multi-term loss function 442 can be weighted. An example of a weighted multi-term loss function 442 is shown below in Equation 6.

$$\mathcal{L}_{multi-term} = 1.5 \cdot \mathcal{L}_{perceptual} + \mathcal{L}_{texture} + 0.5 \cdot \mathcal{L}_{residual} + 400 \cdot \mathcal{L}_{tv} \quad (6)$$

As shown, Equation 6 provides one embodiment of the multi-term loss function 442 weighting various loss terms to determine multi-term loss (e.g., the loss feedback 452). For example, the image transformation system weights the perceptual loss 446 1.5-times the weight provided to the texture loss 450 as well as weights the residual loss 444 at 0.5-times the weight provided to the texture loss 450. As mentioned above, in some embodiments, the weights are chosen based on empirical testing and results. In alternative embodiments, the image transformation system automatically determines the various loss term weights.

FIG. 4B illustrates visual example images of the image exposure transformation network 400 employing different loss terms within the multi-term loss function 442. Each of the example images is of the same waterfall. Further, each of the loss images is based on the training with the same input image 453 (e.g., a short-exposure training image 414) and the same ground truth image 460 (e.g., a long-exposure training image 416).

With only employing the residual loss 444 during training, the image exposure transformation network 400 (e.g., the generator neural network 404) generates the residual loss image 454, which causes the waterfall appears coarse and unnatural (the waterfall and surrounding regions appear to have a checkered pattern). Upon adding the additional loss terms to the multi-term loss function 442 during training, the image exposure transformation network 400 generates the residual loss and perceptual loss image 456. While the residual loss and perceptual loss image 456 appears more natural than the residual loss image 454, the residual loss and perceptual loss image 456 is still slightly coarse and unnatural.

In contrast to the previous synthesized long-exposure images, the residual loss, perceptual loss, and texture loss image 458 shows a smooth and natural synthesized long-exposure image. For example, the residual loss, perceptual loss, and texture loss image 458 has a sharp background and a clear (e.g., non-cloudy) long-exposure effects applied to the waterfall and mist. Indeed, the residual loss, perceptual loss, and texture loss image 458 appears to most resemble the ground truth image 460.

As mentioned above, the image transformation system can implement various embodiments of an image exposure transformation network. For example, although the image exposure transformation network 400 described in connection with FIG. 4A is able to generate synthesized long-exposure images that apply long-exposure effects to corresponding short-exposure images, in one or more embodiments, the synthesized long-exposure images of the image exposure transformation network 400 may be over or under-smoothed. For instance, in some cases, the generated long-exposure effects are less than optimal because the image exposure transformation network 400 primarily learns which regions on a short-exposure image to transform while applying less training with respect to directional movement, such as the direction of water movement, light movement, or the movement of other objects.

Accordingly, FIG. 5A illustrates an embodiment of the image exposure transformation network 500 that predicts and incorporates movement information (i.e., optical flow prediction) into generating synthesized long-exposure images. As shown, the image exposure transformation network 500 in FIG. 5A includes an optical flow prediction network 560, which predicts an optical flow prediction 564 for a short-exposure image. As also shown, the image exposure transformation network 500 also includes the GAN 402 described above in connection with FIG. 4A, including the loss model 440 having the multi-term loss function 442.

In FIG. 5A, the optical flow prediction network 560 includes neural network layers (e.g., convolutional and deconvolutional layers 562) and loss layers 566. The neural network layers can resemble neural network layers within the GAN 402. FIG. 5B below illustrates an example high-level architecture of the optical flow prediction network 560 and the GAN 402.

As mentioned above, the optical flow prediction network 560 generates an optical flow prediction 564 (e.g., optical flow input) for a short-exposure image. In one or more embodiments, the optical flow prediction 564 indicates predicted movement and direction of pixels in a short-exposure training image (e.g., a motion vector for each pixel). In addition, the image transformation system provides the optical flow prediction 564 to the GAN 402 to enable the generator neural network 404 to generate a more realistic and accurate synthesized long-exposure image 430. Indeed, by predicting the optical flow prediction 564 of a short-exposure image, the image transformation system can improve the realism of synthesized long-exposure images.

In one or more embodiments, the image transformation system trains the optical flow prediction network 560 using the image training dataset 410 described previously. For example, the image transformation system provides a short-exposure training image 414 from a training pair 412 to the optical flow prediction network 560. The optical flow prediction network 560 then predicts an optical flow prediction 564 from the single short-exposure training image 414.

The optical flow prediction network 560, in some embodiments, uses a framework that includes movement information. The movement information can guide the flow estimation algorithm of the optical flow prediction network 560 in determining where motion should occur for pixels in a short-exposure image. For example, in one or more embodiments where the image training dataset 410 is limited to images of waterfalls and water features, the image transformation system can utilize a simple FlowNet CNN framework that provides water appearance and movement information. Additional disclosure regarding the simple FlowNet CNN framework is provided in Philipp Fischer et. al., "FlowNet: Learning Optical Flow With Convolutional Networks," arXiv preprint arXiv:1504.06852 (2015), the entire contents of which is hereby incorporated by reference.

As shown in FIG. 5A, the image transformation system trains the optical flow prediction network 560 by providing the optical flow prediction 564 to the loss layers 566. The loss layers 566 include a flow loss function 568, which compares the optical flow prediction 564 to a ground truth flow. In some embodiments, the image transformation system determines the ground truth flow based on the long-exposure training image 416 from the training pair 412 corresponding to the short-exposure training image 414.

In various embodiments, the image transformation system determines a flow loss amount using the flow loss function 568 by comparing the endpoint error (EPE) of pixels between the optical flow prediction 564 predicted by the optical flow prediction network 560 and the ground truth flow (e.g., derived from the corresponding long-exposure training image 416). Equation 7 below provides one example of an objective function for the flow loss.

$$\mathcal{L}_{flow} = \sum_{i,j} \left( (u_{i,j} - \delta_{u_{i,j}})^2 + (v_{i,j} - \delta_{v_{i,j}})^2 \right) \quad (7)$$

In Equation 7, $u_{i,j}$ and $v_{i,j}$ represent the motion on pixel (i,j) of an input image (e.g., the short-exposure training image 414). In addition, $\delta_{u_{i,j}}$, $\delta_{v_{i,j}}$ represent the predictions of the optical flow prediction network 560. In embodiments where the image training dataset 410 is derived from still videos, the image transformation system can easily obtain the ground truth flow. Otherwise, the image transformation system can determine the ground truth flow base on two images where the background remains static and the subject object moves between the images.

The image transformation system can back propagate the flow loss to the convolutional and deconvolutional layers 562 to tune weights and parameters to predict more accurate optical flow predictions for single short-exposure images. For example, the image transformation system tunes the weights and parameters of the optical flow prediction network 560 until the flow loss satisfies (e.g., equals or falls below) a threshold value.

In additional embodiments, the image transformation system jointly trains the optical flow prediction network 560 with the GAN 402. By jointly training the optical flow prediction network 560 with the GAN 402, the optical flow prediction network 560 learns to predict optical flow predictions that result in more realistic and accurate synthesized long-exposure images. Joint training is further facilitated by the optical flow prediction network 560 and the GAN 402 training using the same training pair 412 at the same time. Further, joint training enables the image transformation system to better learn feature representations in both tasks (e.g., training both the optical flow prediction network 560 and the GAN 402). Indeed, the optical flow prediction network 560 lacks the ability alone to learn feature representations for texture synthesis, while GAN 402 lacks the ability alone to generate motion information. Therefore, joint training provides the opportunity for both tasks to share their feature representations.

As shown in the image exposure transformation network 500, the image transformation system employs a combined loss function 570 to combine the flow loss function 568 and the multi-term loss function 442. While not illustrated from simplicity, the image transformation system can provide the overall loss to the optical flow prediction network 560 and/or the GAN 402. In some embodiments, the image transformation system iteratively (e.g., back and forth) provides the overall loss between the two neural networks. In alternative embodiments, the image transformation system concurrently provides the overall loss between the two neural networks. Additional examples of training are provided in connection with FIG. 5B below.

To illustrate determining the overall loss of the combined loss function 570, Equation 8 below provides an example objective function.

$$\mathcal{L}_{overall}(I_s) = \mathcal{L}_{multi-term}(I_s, I_f) + \mathcal{L}_{flow}(I_s) \quad (8)$$

In Equation 8, $I_s$ represents the input image (e.g., the short-exposure training image 414) and $I_f$ represents the optical flow prediction 564 predicted by the optical flow prediction network 560 from the input image. Thus, by minimizing the objective function shown in FIG. 8, the image transformation system propagates features from both short-exposure images and corresponding optical flow predictions to generate synthesized long-exposure images.

FIG. 5B illustrates a high-level architecture of the image exposure transformation network 500 of FIG. 5A. In particular, FIG. 5B illustrates neural network layers of the optical flow prediction network 560 and the GAN 402, shown as a unified two-stage model within the image exposure transformation network 500. As shown, the optical flow prediction network 560 receives a short-exposure training image 414 and includes the convolutional and deconvolutional layers 562, the optical flow prediction 564, and the flow loss function 568. In addition, the GAN 402 receives the short-exposure training image 414 and the optical flow prediction 564 to from a channel-stacked image 569 that concatenates the short exposure image 414 and the optical flow prediction 546. Further, the GAN 402 includes convolutional and deconvolutional layers, a synthesized image (i.e., a synthesized long-exposure image 434), and the multi-term loss function 442.

In one or more embodiments, the optical flow prediction network 560 is based on the simple FlowNet CNN framework mentioned above. In some embodiments, the optical flow prediction network 560 uses an encoder-decoder architecture with skip links to improve feature fusions (e.g., feature concatenations between the encoder and decoder). In addition, in some embodiments, the GAN 402 is a fully-convolutional neural network based on a U-Net structure with skip links. Additional disclosure regarding the U-Net structure is provided in Olaf Ronneberger et al., "U-Net: Convolutional Networks For Biomedical Image Segmentation," in International Conference on Medical Image Computing and Computer-Assisted Intervention, vol. 9351, pages 234-241, Springer, Cham (2015), the entire contents of which is hereby incorporated by reference.

As shown, the GAN 402 includes less neural network layers than the optical flow prediction network 560. Further, while not illustrated, each of the layers in the GAN 402 can be followed by a ReLu activation function. Moreover, the GAN 402 can include a sigmoidal function to the output of the last fully connected layer that produces a probability of whether the short-exposure training image 414 is a real long exposure image.

As mentioned above, in some embodiments, the image transformation system jointly trains the optical flow prediction network 560 and the GAN 402 within the image exposure transformation network 500. For instance, as described below, the image transformation system starts the joint training from scratch. Further, the image transformation system iteratively trains each neural network.

To illustrate, the image transformation system first optimizes the GAN 402 by freezing the weights of the optical flow prediction network 560 to train the GAN 402 using the image training dataset 410. For example, the image transformation system trains using a Stochastic gradient descent (SDA) optimizer with a batch size of 16, starting from a learning rate $1e^{-8}$ and decreasing the learning rate by half for every 10,000 iterations. Then, to train the optical flow prediction network 560, the image transformation system freezes the weights of the GAN 402 and updates the weights of the optical flow prediction network 560 using the flow loss function 568 and the ground truth flow derived from a long-exposure training image 416. In this manner, the image transformation system iteratively focuses on a task in one neural network, while still obtaining useful representations from the other neural network.

After the losses converge using the large learning rate in offline training as described above, the image transformation system can perform online training. In particular, the image transformation system can perform an online training round using a smaller learning rate. For example, in some embodiments, the image transformation system trains both the optical flow prediction network 560 and the GAN 402 together to fine-tune the entire image exposure transformation network 500 to generate more realistic synthesized long-exposure images.

FIG. 6A shows another embodiment of the image exposure transformation network 600. As shown, the image exposure transformation network 600 includes an appearance guided attention network 680, which predicts an attention map 686. In addition, the image exposure transformation network 600 includes the GAN 402 described above in connection with FIG. 4A, including the loss model 440 having the multi-term loss function 442.

In one or more embodiments, the appearance guided attention network 680 includes multiple convolutional layers 684 as part of the encoder. For example, in some embodiments, the convolutional layers 684 in the appearance guided attention network 680 match the number and size (e.g., dimensions and filters) of convolutional layers included in the generator neural network 404 of the GAN 402. In alternative embodiments, the appearance guided attention network 680 includes a different number or type of convolutional layers 684. Further, in various embodiments, the appearance guided attention network 680 includes additional or different types of layers than shown.

As shown, the appearance guided attention network 680 generates an attention map 686 corresponding to a short-exposure image. In one or more embodiments, an attention map 686 correlates identified features within a short-exposure image with attention weights that influences how intensely (i.e., a magnitude) the generator neural network 404 applies long-exposure effects to that feature. Overall, the aim of the appearance guided attention network 680 is to enhance the long-exposure effect in moving regions of an image (e.g., regions with the subject object).

To illustrate, if the appearance guided attention network 680 determines that a feature is redundant or less important, then the attention map 686 will have a low attention weight assigned to the features, which results in little to no long-exposure effects being applied to the feature by the generator neural network 404. Otherwise, if the appearance guided attention network 680 determines a feature to be important, the attention map 686 will assign the feature a higher attention weight and the generator neural network 404 will apply greater long-exposure effects to the feature. Thus, given an image of a waterfall as the subject object, the appearance guided attention network 680 learns to assign a higher importance/attention weight to the moving water and a lower importance/attention weight to the background scenery.

To generate an attention map 686, the image transformation system provides a short-exposure training image 414 to the appearance guided attention network 680. In one or more embodiments, the appearance guided attention network 680 divides the appearance guided attention network into small blocks, portions, or regions. In some embodiments, regions can have seemingly arbitrarily boarders that are based on identified features within the short-exposure training image 414. Alternatively, regions may be based on a grid system.

For each region, the appearance guided attention network 680 identifies one or more features and determines an importance for the feature, which is learned through training. Based on the determined importance, the appearance guided attention network 680 assigns an attention weight. In some embodiments, the appearance guided attention network 680 determines attention weights using a softmax function that analyzes both visual features extracted from the convolutional layers as well as tunable parameters learned by the appearance guided attention network 680. Once determined, the appearance guided attention network 680 can add the attention weights for each region to the attention map 686. An example of an attention map is shown in FIG. 6C, which is described below.

As shown, the appearance guided attention network 680 provides the attention map 686 to the GAN 402. For example, as further detailed in FIG. 6B, the appearance guided attention network 680 provides the attention map 686 to the GAN 402 after the encoder of the generator neural network 404. The generator neural network 404 then applies the attention weights from the attention map 686 when generating the synthesized long-exposure image 430, as further described below.

As mentioned above, the appearance guided attention network 680 can learn how to identify the importance of features corresponding to movement of a subject object through training. As shown in FIG. 6A, the image transformation system can implicitly (e.g., not based on an attention-specific loss function) train the appearance guided attention network 680 along with the GAN 402 using the multi-term loss function 442, as described next.

In one or more embodiments, the multi-term loss function 442 also provides the loss feedback 452 to the appearance guided attention network 680 during training via back propagation. In this manner, as the appearance guided attention network 680 learns to better detect features and their corresponding importance, the multi-term loss will continue to shrink. Indeed, as long as the appearance guided attention network 680 can learn to generate more accurate attention maps, the multi-term loss will decrease.

Similar to the optical flow prediction network described above, the image transformation system can iteratively train the appearance guided attention network 680 and the GAN 402 with a large learning rate, and then concurrently fine-tune the models with a small learning rate. For example, when iteratively training the appearance guided attention network 680 and the GAN 402, the image transformation system can freeze the weights on one neural network while tuning the weights of the other neural network. In this manner, the image transformation system iteratively focuses on a task in one neural network, while still obtaining useful representations from the other neural network.

Once trained, the appearance guided attention network 680 can generate an attention map 686 from a single short-exposure image, with no additional visual or semantic information. For example, the appearance guided attention network 680 generates an attention map 686 that gives little or no weight to regions and/or features of a short-exposure image that are to remain motionless (e.g., the background scenery). Accordingly, the appearance guided attention network 680 reduces the negative impact of motion noise that occurs from camera motion. Indeed, if an image background has camera motion, the generator neural network 404 will remove the motion based on a low or zero corresponding attention weight in the attention map 686.

As shown in FIG. 6A, the image exposure transformation network 600 optionally includes the optical flow prediction 564. In various embodiments, the optical flow prediction 564 is generated by an optical flow prediction network, such as the optical flow prediction network 560 described in connection with FIGS. 5A-5B. In alternative embodiments, the optical flow prediction 564 is otherwise derived, such by comparing movement in two or more images in a sequence. For example, using a still video clip and/or a sequence of images, the image transformation system uses one of the frames as an input image and the other frames to derive the optical flow prediction.

In various embodiments, the image exposure transformation network 600 employs both the appearance guided attention network 680 and the optical flow prediction network 560 to generate synthesized long-exposure images. In other embodiments, the image transformation system employs either the optical flow prediction network 560 or the appearance guided attention network 680. Further, in some embodiments, the image transformation system employs neither, as described above.

Figure 6B:
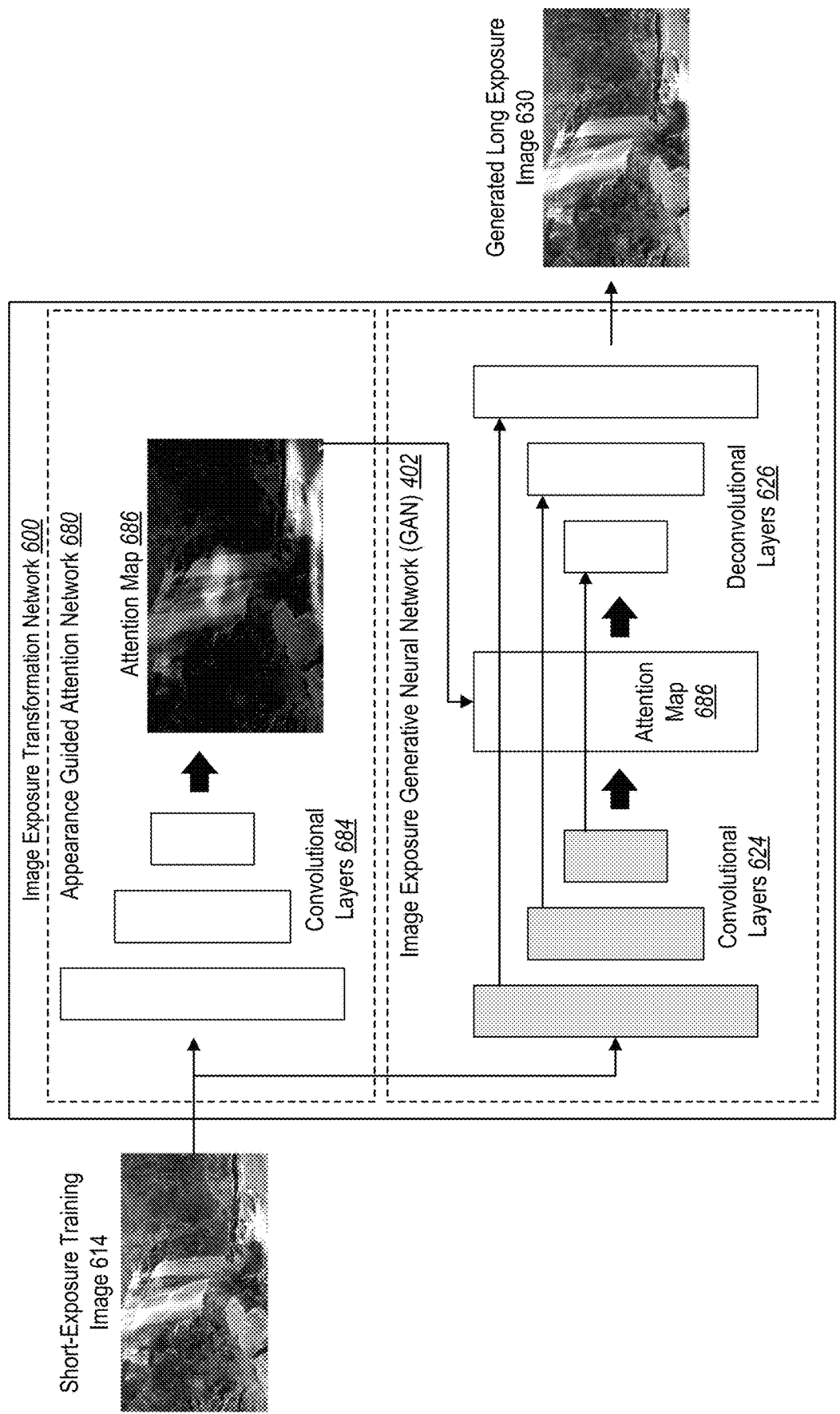
FIG. 6B illustrates a trained image exposure transformation network that includes an image exposure generator neural network, a discriminator neural network, and an appearance guided attention network in accordance with one or more embodiments.

Turning now to the next figure, FIG. 6B illustrates a high-level architecture of the image exposure transformation network 600 of FIG. 6A. As shown, the image exposure transformation network 600 includes the appearance guided attention network 680 and the GAN 402. The appearance guided attention network 680 includes the convolutional layers 684 similar to the convolutional layers 624 of the GAN 402. Both the appearance guided attention network 680 and the GAN 402 receive the same single short-exposure image 614 as input.

As also shown and as described above, the appearance guided attention network 680 generates the attention map 686 for the short-exposure image 614 using the convolutional layers 684. In turn, the image transformation system provides the attention map 686 to the GAN 402 after the convolutional layers 624. Indeed, the image transformation system provides the attention map 686 to the generator neural network 404 after the last convolutional layer.

Upon receiving the attention map 686, the generator neural network 404 applies the weights within each region of the attention map 686 to corresponding features. For features having a large attention weight, the GAN 402 applies more long-exposure effects, and vice versa. Upon processing the weighted features through the deconvolutional layers 626, the GAN 402 outputs a synthesized long-exposure image 630 having areas of applied more long-exposure effects according to their respective attention weights.

FIG. 6C shows two examples of input images and corresponding attention maps. For instance, FIG. 6C includes a first input image 692a and a corresponding first attention map 694a as well as a second input image 692b and a corresponding second attention map 694b. As shown, the input images are still images that include a static background and a moving subject object.

As described above, the appearance guided attention network 680 detects one or more moving subject objects and assigns various attention weights based on a determined importance level. To illustrate, the intensity of light (e.g., the brightness) corresponds to the determined importance level, and in turn, higher attention weights. Thus, upon receiving these attention maps and the corresponding input images, generator neural network 404 will apply the greatest long-exposure effects to the lightest areas.

FIGS. 4A-6B described various embodiments of training an image exposure transformation network. Accordingly, the actions and algorithms described in connection with FIGS. 4A-6B provide example structure for performing a step for training, based on image exposure pairs, an image exposure transformation network using a multi-term loss function. For example, the actions and algorithms described in connection with FIG. 4A of training the image exposure transformation network 400 provide structure for performing a step for training an image exposure transformation network. In some embodiments, the actions and algorithms described in connection with FIG. 5A of training the image exposure transformation network 500 provide structure for performing a step for training an image exposure transformation network. In other embodiments, the actions and algorithms described in connection with FIG. 6A of training the image exposure transformation network 600 provide structure for performing a step for training an image exposure transformation network.

Figure 7:
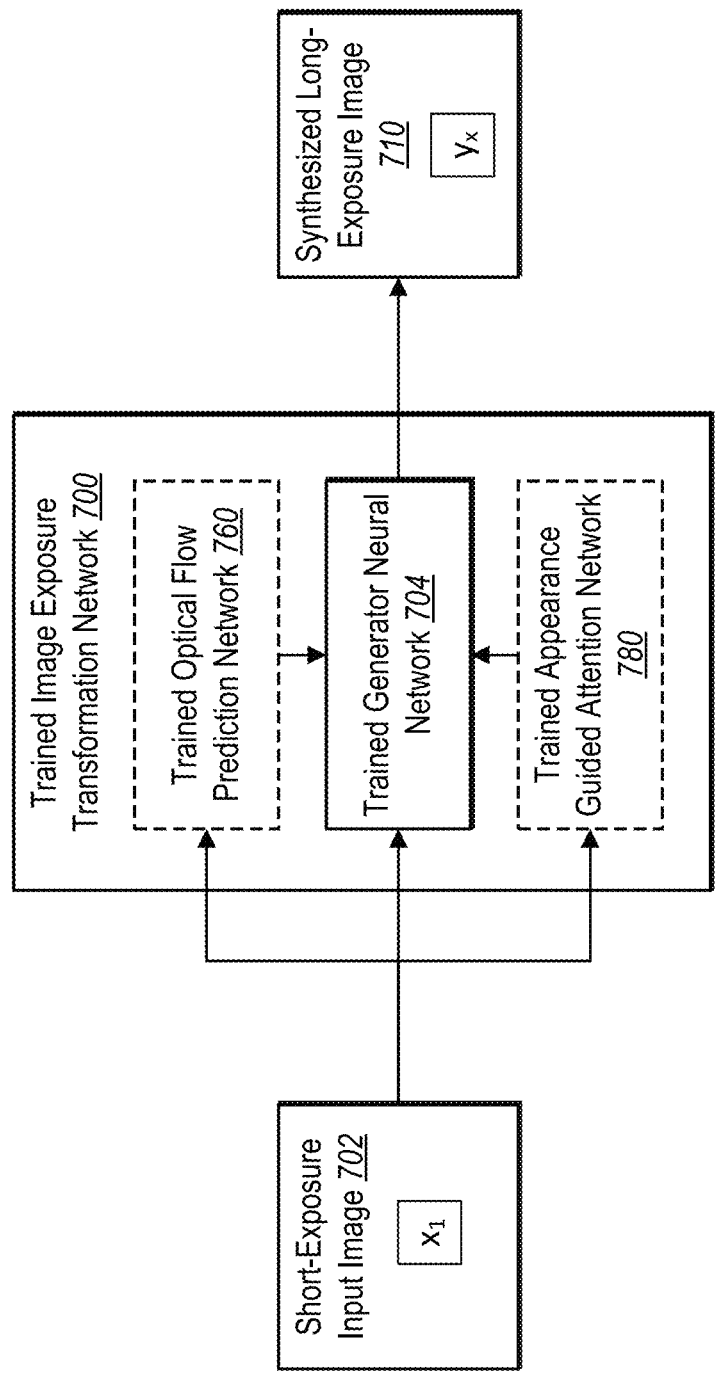
FIG. 7 illustrates a diagram of employing a trained image exposure transformation network to generate realistic synthesized long-exposure images from single short-exposure images in accordance with one or more embodiments.

In addition, while FIGS. 4A-6B describe training embodiments of an image exposure transformation network, FIG. 7 illustrates employing a trained image exposure transformation network 700 to generate realistic long-exposure images from single short-exposure images in accordance with one or more embodiments. As shown in FIG. 7, the image transformation system provides a single short-exposure target image 702 to the trained image exposure transformation network 700, which generates a realistic synthesized long-exposure image 710.

In one or more embodiments, the short-exposure target image 702 is a live captured image. For example, the user captures the short-exposure target image 702 using the camera on their mobile client device. In alternative embodiments, the short-exposure target image 702 is a stored or previously captured image. For instance, the user converts an analog image to digital form to use as the short-exposure target image 702. In another instance, the user selects (or the image transformation system automatically selects) the short-exposure target image 702 from a collection of images.

As shown, the trained image exposure transformation network 700 includes a trained generator neural network 704 (i.e., an image exposure generator neural network). The trained generator neural network 704 corresponds to the generator neural network 404 within the GAN 402 described in connection with FIGS. 4A-6B. As described above, the GAN 402 also includes the discriminator neural network 406 during training. However, through training, the generator neural network 404 learns to independently generate realistic synthesized long-exposure images. While the trained image exposure transformation network 700 does not have a discriminator neural network, in alternative embodiments, the trained image exposure transformation network 700 includes a discriminator neural network that performs a preliminary realness classification/verification on the generated synthesized long-exposure images.

As also shown, the trained image exposure transformation network 700 also includes an optional trained optical flow prediction network 760 and/or an optional trained appearance guided attention network 780. For example, in some embodiments, the trained image exposure transformation network 700 includes the trained optical flow prediction network 760, which the image transformation system utilizes to generate an optical flow prediction based on the short-exposure target image 702. As described above, the optical flow prediction indicates motion influences (e.g., the movement and direction) of pixels needed to realistically transform the short-exposure target image 702 into the synthesized long-exposure image 710 (e.g., by generating texture simulating the long-exposure effect).

As with the training stage, the image transformation system can provide the optical flow prediction to the trained generator neural network 704 as additional input to the short-exposure target image 702. The trained generator neural network 704 then utilizes the optical flow prediction when applying long-exposure effects to mimic accurate movement patterns of a subject object within the short-exposure target image 702, which results in a more realistic synthesized long-exposure image 710.

In additional embodiments, or in alternative embodiments, the image transformation system employs the trained appearance guided attention network 780 to generate an attention map from the short-exposure target image 702. As described above, the attention map provides the spatial context of the short-exposure target image 702 by indicating a magnitude (i.e., attention weight) of the long-exposure effect to apply to each region and/or identified feature.

In embodiments where the trained appearance guided attention network 780 is included in the trained image exposure transformation network 700, the image transformation system provides the attention map to the trained generator neural network 704 along with the short-exposure target image 702. The trained generator neural network 704 utilizes the attention weights of the attention map in applying the long-exposure effects to corresponding regions of the short-exposure target image 702.

In various embodiments, the image transformation system provides the trained image exposure transformation network 700 to a client device associated with a user. For example, the image transformation system stores the trained image exposure transformation network 700 on a user's mobile client device within an application. Because the trained image exposure transformation network 700 is compact (e.g., 45 MB uncompressed), it is easily stored on and executed by most current mobile client devices.

While not illustrated, the image transformation system can provide a graphical user interface to a user via an associated client device (e.g., a mobile client device) to received short-exposure target images and provide synthesized long-exposure images. In additional embodiments, the graphical user interface facilitates user input corresponding to the trained image exposure transformation network 700. For example, the image transformation system enables the user to increase (or decrease) the attention weight for a region of the short-exposure target image/synthesized long-exposure image, which increases (or decreases) the long-exposure effects applied to the selected region. To illustrate, if the image transformation system improperly assigns a higher attention weight to a static object in the short-exposure target image 702 (which causes the object to appear blurred in the synthesized long-exposure image 710), the image transformation system can receive user input setting the attention weight of that object to zero. The image transformation system can regenerate the synthesized long-exposure image 710 with no long-exposure effect applied to the selected object.

In another example, the image transformation system enables a user to provide input modifying the degree of long-exposure effects that the image transformation system applies to the short-exposure target image 702. For example, the image transformation system has a slider or other selectable option that increases or decreases the long-exposure effects for one or more regions and/or objects within the short-exposure target image 702. In an additional example, the image transformation system enables a user to alter the optical flow prediction by correcting the direction or magnitude of pixel movements. Further, in one or more embodiments, the image transformation system displays an updated synthesized long-exposure image to the user in real-time as they adjust available inputs.

FIG. 7 describes various embodiments of applying a trained image exposure transformation network. Accordingly, the actions and algorithms described in connection with FIG. 7 provide example structure for performing a step for synthesizing a long-exposure image based on a single short-exposure target image utilizing the trained image exposure transformation network. Further, because FIG. 7 describes one or more correlations between training an image exposure transformation network and utilizing a trained image exposure transformation network, FIGS. 4A-6B also provide support for actions and algorithms for performing the step for synthesizing a long-exposure image based on a single short-exposure target image utilizing the trained image exposure transformation network.

Figure 8A:
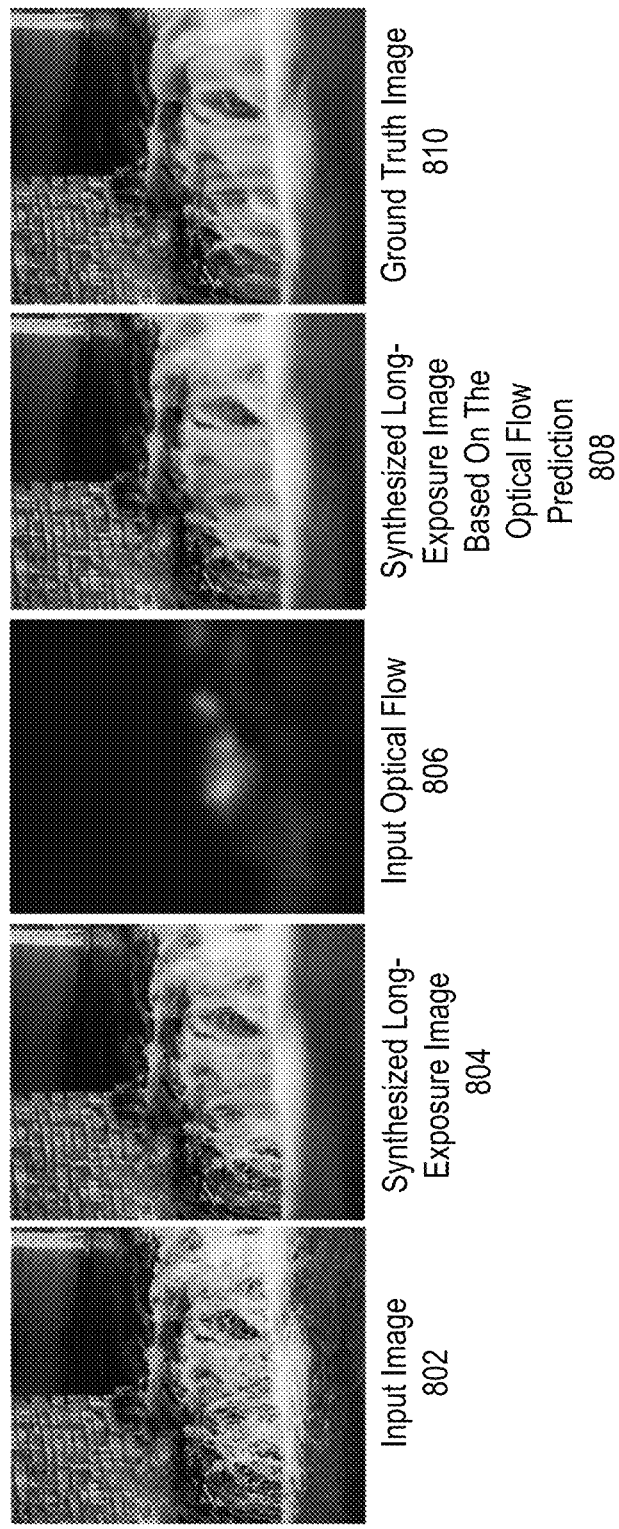

Turning now to FIGS. 8A-8B, example visual results of the trained image exposure transformation network are provided. To illustrate, FIG. 8A shows results of a synthesized long-exposure image generated with and without optical flow prediction. In particular, FIG. 8A includes an input image 802 (i.e., a short-exposure target image). When providing the input image 802 to a trained image exposure transformation network within an optical flow prediction network, the trained image exposure transformation network generates the synthesized long-exposure image 804, shown to the right of the input image 802.

Additionally, when the image transformation system employs a trained image exposure transformation network jointly trained with an optical flow prediction network, the image transformation system first generates the optical flow prediction 806, then applies the optical flow prediction 806 to generate the synthesized long-exposure image based on the optical flow prediction 808. As shown, the synthesized long-exposure image based on the optical flow prediction 808 more closely resembles the ground truth image 810 than the synthesized long-exposure image 804 generated without the optical flow prediction 806. Thus, as shown, while the trained image exposure transformation network is able to generate long-exposure images without optical flow prediction, the generated long-exposure images are enhanced by applying the optical flow predictions.

As a note, FIG. 8A includes the optical flow prediction 806. While not shown, this optical flow prediction 806 is superior (e.g., includes more flow information) to an optical flow prediction from a pre-trained optical flow prediction network. As described above, in various embodiments, the image transformation system jointly trains the optical flow prediction network in connection with the GAN. Thus, unlike a pre-trained optical flow prediction network, the jointly trained optical flow prediction network is influenced by the accuracy of the synthesized long-exposure images, which results in generating richer, more detailed optical flow predictions, and also results in more realistic synthesized long-exposure images.

FIG. 8B shows additional synthesized long-exposure images generated by the trained image exposure transformation network from a short-exposure target image. In particular, FIG. 8B includes a first input image 812a and a corresponding first synthesized long-exposure image 814a as well as a second input image 812b and a corresponding second synthesized long-exposure image 814b. The synthesized long-exposure images appear realistic and satisfactory. As described above, the image transformation system generates the synthesized long-exposure images using a trained generator neural network and a single short-exposure target image.

Figure 9:
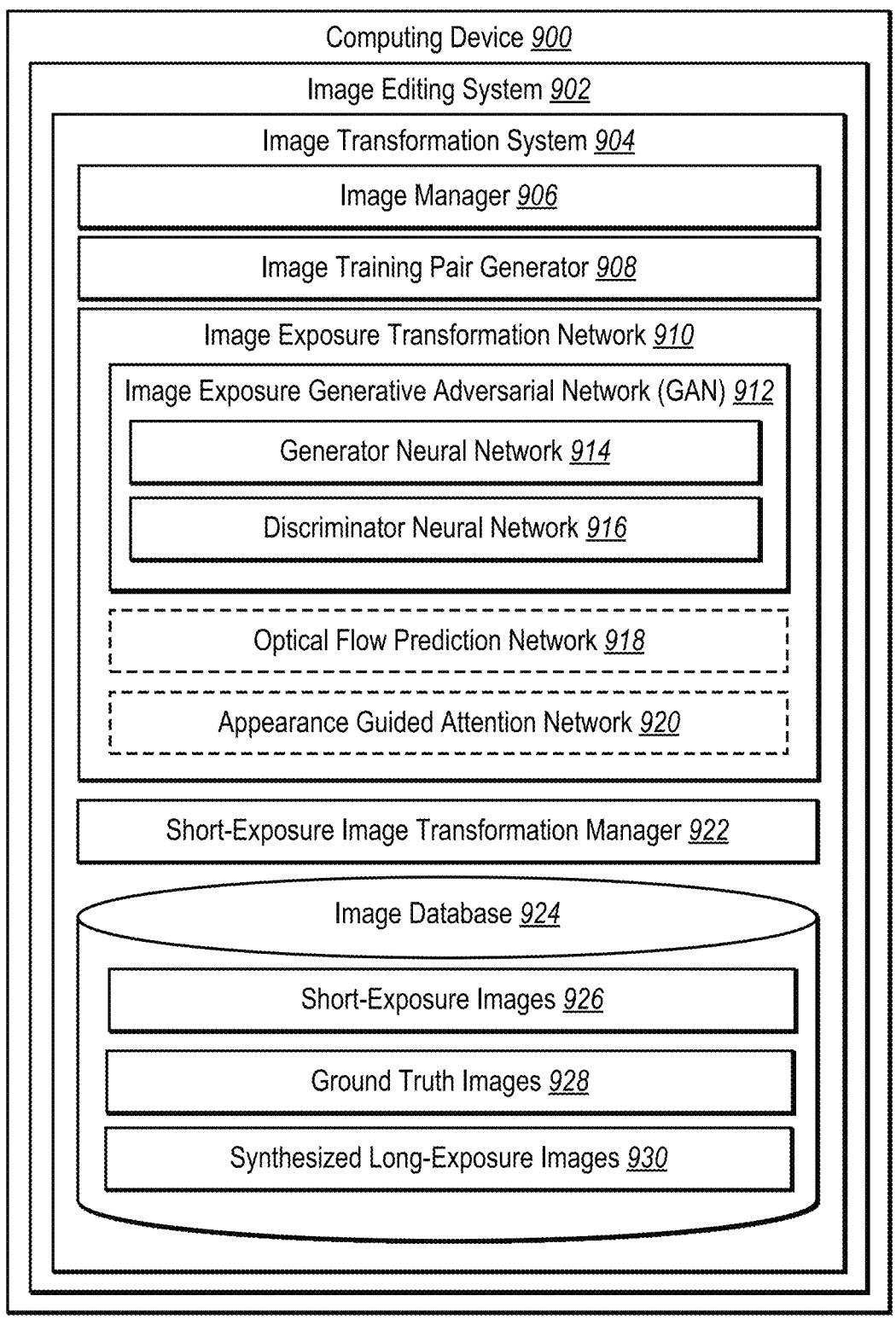
FIG. 9 illustrates a schematic diagram of an image transformation system in accordance with one or more embodiments.

Referring now to FIG. 9, additional detail is provided regarding capabilities and components of the image transformation system in accordance with one or more embodiments. In particular, FIG. 9 shows a schematic diagram of an example architecture of the image transformation system 904 located within an image editing system 902 and hosted on a computing device 900. The image transformation system 904 can represent one or more embodiments of the image transformation system described previously.

As shown, the image transformation system 904 is located on a computing device 900 within an image editing system 902. In general, the computing device 900 may represent various types of client devices. For example, in some embodiments, the client is a mobile device, such as a laptop, a tablet, a mobile telephone, a smartphone, etc. In other embodiments, the computing device 900 is a non-mobile device, such as a desktop or server, or another type of client device. Additional details with regard to the computing device 900 are discussed below as well as with respect to FIG. 14.

The image editing system 902, in general, facilitates the creation, modification, sharing, and/or deletion of digital images within applications. For example, the image editing system 902 provides a variety of tools on the computing device 900 related to image creating and editing (e.g., photo-editing). In addition, the image editing system 902 can access additional locally or remotely stored repositories of still images (i.e., short-exposure images). Further, in some embodiments, the image editing system 902 can be located separately from the computing device 900 (e.g., on a server device) and communicate with the image transformation system 904.

Moreover, the image editing system 902 can operate in connection with one or more applications to generate synthesized long-exposure images on the computing device 900. For example, in one or more embodiments, the image editing system 902 operates in connection with digital design applications such as ADOBE® PHOTOSHOP®, ADOBE® ILLUSTRATOR®, ADOBE® INDESIGN®, or other image editing applications.

As illustrated in FIG. 9, the image transformation system 904 includes various components for performing the processes and features described herein. For example, the image transformation system 904 includes an image manager 906, an image training pair generator 908, an image exposure transformation network 910, a short-exposure image transformation manager 922, and an image database 924. Each of these components is described below in turn.

As mentioned above, the image transformation system 904 includes the image manager 906. In general, the image manager 906 facilitates identifying, accessing, receiving, obtaining, generating, importing, exporting, copying, modifying, removing, and organizing images. In one or more embodiments, the image manager 906 operates in connection with the image editing system 902 to access images. Images can include short-exposure images 926, ground truth images 928, and synthesized long-exposure images 930, each of which are described above. Further, as shown, the image manager 906 can store and/or access one or more of the images within the image database 924.

As shown, the image transformation system 904 includes the image training pair generator 908. In some embodiments, the image training pair generator 908 generates images to be included in an image training dataset, as described above. For example, the image training pair generator 908 generates a ground truth/long-exposure image from a sequence of images (e.g., a still video), as explained earlier. In addition, the image training pair generator 908 can group short-exposure images 926 and corresponding ground truth images 928 to create a training pair. Further, the image training pair generator 908 can store the image training pairs in the image database 924.

As shown, the image transformation system 904 includes the image exposure transformation network 910. The image exposure transformation network 910 includes an image exposure generative adversarial network 912 (or simply "GAN 912"), which includes a generator neural network 914 (i.e., an image exposure generator neural network) and a discriminator neural network 916 (i.e., an adversarial discriminator neural network). As explained above, the generator neural network 914 learns to generate a realistic synthesized long-exposure image from a single short-exposure image and the discriminator neural network 916 aids in training the generator neural network 914 by distinguishing realistic long-exposure images.

In various embodiments, the image transformation system 904 trains the GAN 912 using supervised learning based on an image training dataset that includes image training pairs of short-exposure images and corresponding ground truth/long-exposure images. In addition, the image transformation system 904 trains the GAN 912 using a multi-term loss function. As described above, the multi-term loss function can include terms for residual loss, perceptual loss, total variance loss, and texture loss.

As also shown, the image exposure transformation network 910 optionally includes an optical flow prediction network 918 and/or an appearance guided attention network 920. As described above, the image transformation system 904 trains the optical flow prediction network 918 to predict an optical flow prediction from a single short-exposure image. Similarly, the image transformation system 904 trains the appearance guided attention network 920 to create an attention map from a single short-exposure image. The image transformation system 904 can jointly train the optical flow prediction network 918 and/or the appearance guided attention network 920 with the GAN 912 to improve overall learning. Additional detail regarding the optical flow prediction network 918, optical flow predictions (e.g., optical flow inputs), the appearance guided attention network 920, and attention maps is provided above.

FIG. 9 also shows the image transformation system 904 including the short-exposure image transformation manager 922. In one or more embodiments, the short-exposure image transformation manager 922 facilitates transforming a single short-exposure image (e.g., a target image) into a synthesized long-exposure image. For example, the short-exposure image transformation manager 922 utilizes one or more embodiments of the trained image exposure transformation network, which are described above in connection with FIG. 7.

In some embodiments, the short-exposure image transformation manager 922 provides a graphical user interface to a user to interact with the image transformation system 904. For example, the short-exposure image transformation manager 922 facilitates receiving a short-exposure image (e.g., live-captured or stored short-exposure image) as well as providing a corresponding synthesized long-exposure image to the user. In some embodiments, the short-exposure image transformation manager 922 also provides a user with selectable options to modify the long-exposure effects applied to a synthesized long-exposure image.

As also shown, the image transformation system 904 includes the image database 924. The image database 924 includes the short-exposure images 926 and the ground truth images 928. As described above, the short-exposure images 926 can include short-exposure training images and short-exposure target images (e.g., captured or stored). In addition, the ground truth images 928 can include long-exposure training images, such as images generated by the image training pair generator 908. In some embodiments, the image database 924 separately stores one or more image training datasets.

In addition, as shown, the image database 924 includes synthesized long-exposure images 930. The synthesized long-exposure images 930 can include long-exposure images generated by the image transformation system 904. Further, while not illustrated, the image database 924 can also include real (i.e., naturally captured) long-exposure images. As described above, in some embodiments, the image transformation system 904 uses real long-exposure images to train the discriminator neural network 916 to learn features of real long-exposure images.

Each of the components 902-930 of the image transformation system 904 can include software, hardware, or both. For example, the components 902-930 can include one or more instructions stored on a computer-readable storage medium and executable by processors of one or more computing devices, such as a client device (e.g., a mobile client device) or server device. When executed by the one or more processors, the computer-executable instructions of the image transformation system 904 can cause a computing device to perform the feature learning methods described herein. Alternatively, the components 902-930 can include hardware, such as a special-purpose processing device to perform a certain function or group of functions. In addition, the components 902-930 of the image transformation system 904 can include a combination of computer-executable instructions and hardware.

Furthermore, the components 902-930 of the image transformation system 904 may be implemented as one or more operating systems, as one or more stand-alone applications, as one or more modules of an application, as one or more plug-ins, as one or more library functions or functions that may be called by other applications, and/or as a cloud-computing model. Thus, the components 902-930 may be implemented as a stand-alone application, such as a desktop or mobile application. Additionally, the components 902-930 may be implemented as one or more web-based applications hosted on a remote server. The components 902-930 may also be implemented in a suite of mobile device applications or "apps." To illustrate, the components 902-930 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Systems Incorporated in the United States and/or other countries.

Figure 10:
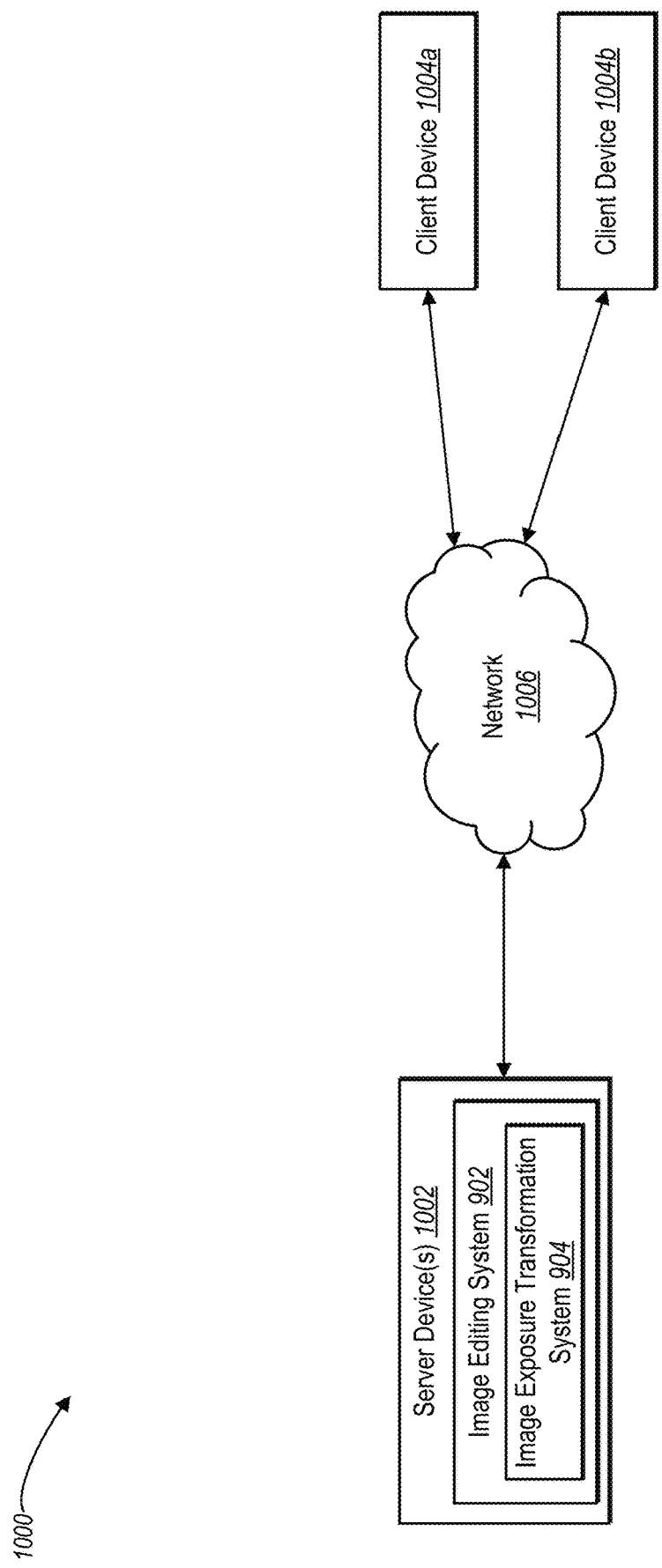
FIG. 10 illustrates a diagram of an environment in which an image transformation system can operate in accordance with one or more embodiments.

FIG. 10 illustrates a schematic diagram of an environment 1000 in which the image transformation system 904 may be implemented in accordance with one or more embodiments. In one or more embodiments, the environment 1000 includes various computing devices including server device(s) 1002 and one or more client devices 1004*a*, 1004*b*. In addition, the environment 1000 includes a network 1006. The network 1006 may be any suitable network over which the computing devices can communicate. Example networks are discussed in more detail below with regard to FIG. 14.

As illustrated in FIG. 10, the environment 1000 includes the server device(s) 1002, which may comprise any computing device, such as one or more of the computing devices described below in relation to FIG. 14. In addition, the server device(s) 1002 includes the image editing system 902 and the image transformation system 904, which are described previously. For example, as described above, the image transformation system 904 can train and apply an image exposure transformation network to generate a synthesized long-exposure image from a single short-exposure image.

In addition, the environment 1000 includes the one or more client devices 1004a, 1004b. The client devices 1004a, 1004b may comprise any computing device, such as the one or more of the computing devices described below in relation to FIG. 14. As described above, the one or more client devices 1004a, 1004b can employ a trained image exposure transformation network to generate synthesized long-exposure images.

As illustrated, in one or more embodiments, the server device(s) 1002 can include all, or a portion of, the image transformation system 904. In particular, the image transformation system 904 can comprise an application running on the server device(s) 1002 or a portion of a software application that can be downloaded from the server device(s) 1002. For example, the image transformation system 904 can include a web hosting application that allows a client device 1004a to interact with content hosted on the server device(s) 1002. To illustrate, in one or more embodiments of the environment 1000, the client device 1004a accesses a web page supported by the server device(s) 1002. In particular, the client device 1004a can run an application to allow a user to access, generate view, select, create, and/or modify synthesized long-exposure images within a web page or website hosted at the server device(s) 1002 (e.g., a web page enables a user to provide a short-exposure target image, and receive, from the server, a synthesized long-exposure image).

Although FIG. 10 illustrates a particular arrangement of the server device(s) 1002, the client devices 1004a, 1004b and the network 1006, various additional arrangements are possible. For example, while FIG. 10 illustrates the one or more client devices 1004a, 1004b communicating with the server device(s) 1002 via the network 1006, in one or more embodiments a single client device may communicate directly with the server device(s) 1002, bypassing the network 1006. Similarly, although the environment 1000 of FIG. 10 is depicted as having various components, the environment 1000 may have additional or alternative components. For example, the image transformation system 904 can be implemented on multiple computing devices. In particular, the image transformation system 904 may be implemented in whole by the server device(s) 1002 or the image transformation system 904 may be implemented in whole by the client device 1004a. Alternatively, the image transformation system 904 may be implemented across multiple devices or components (e.g., utilizing the server device(s) 1002 to train an image exposure transformation network and the one or more client devices 1004a, 1004b to execute the trained image exposure transformation network).

Figure 11:
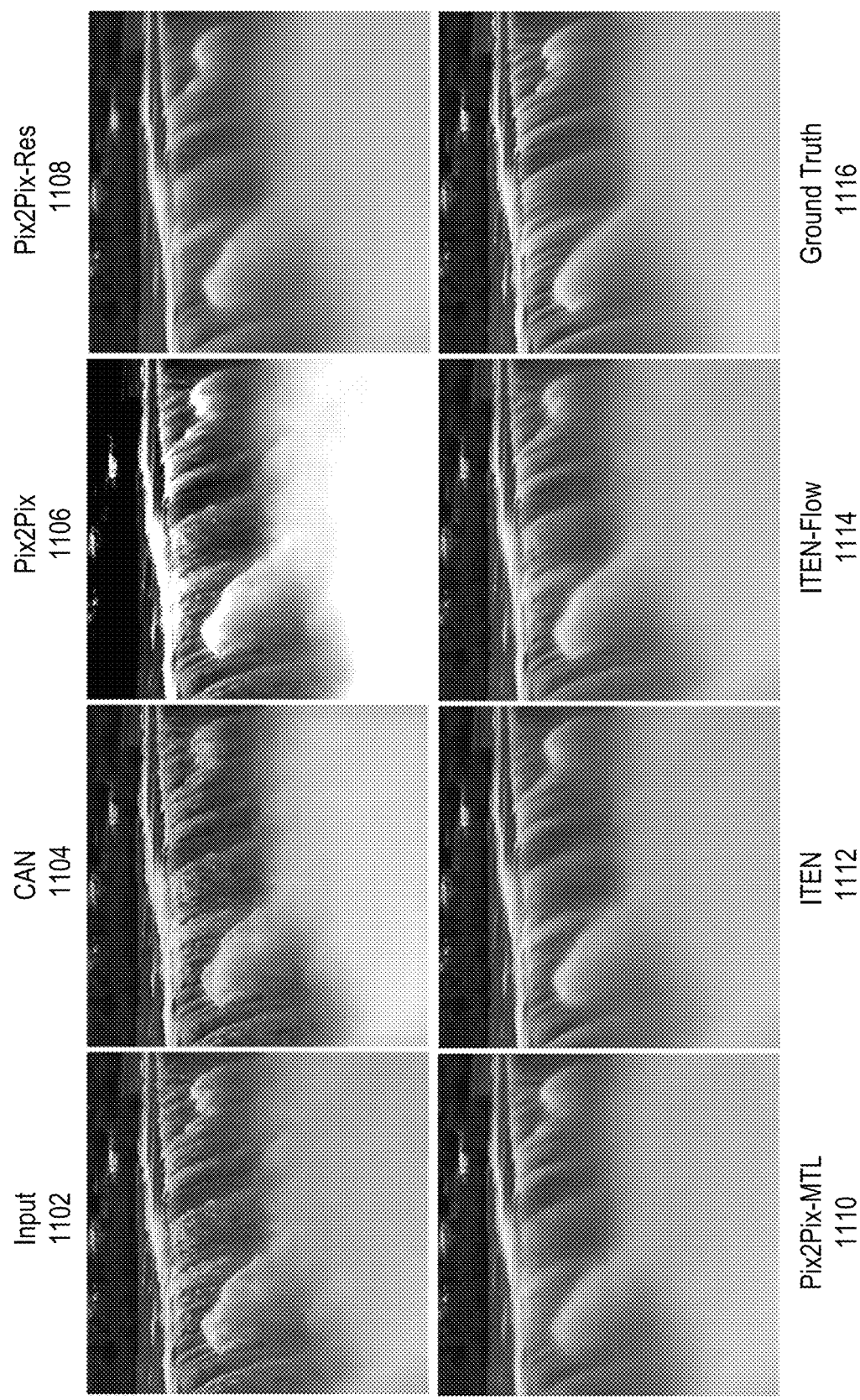
FIG. 11 illustrates synthesized long-exposure images generated by the image transformation system compared to long-exposure images generated using conventional systems.

Turning now to FIG. 11, additional detail is provided with respect to experimental results of the image transformation system described herein. To illustrate, FIG. 11 shows results of an experiment performed by researchers comparing synthesized long-exposure images generated by the image transformation system described herein to long-exposure images generated by conventional systems (i.e., baseline methods). As further below, FIG. 11 shows images of an input 1102 and a ground truth 1116 used in the experiment. In addition, FIG. 11 shows long-exposure images generated by various baseline methods (e.g., 1104-1110) as well as synthesized long-exposure images generated by various embodiments of the image exposure transformation network the image transformation system described above (e.g., 1112, 1114).

As an overview of the experiment, researchers evaluated both qualitative and quantitative results between the embodiments of the image exposure transformation network described above and baseline methods. The researchers used the same training pairs (e.g., a short-exposure training image and corresponding long-exposure training image/ground truth image) to train the two embodiments of the image exposure transformation network and the baseline methods.

The researchers also set aside two sets of training pairs for testing (e.g., test set 1 and test set 2). Notably, test set 1 included testing images having the same resolution as the images used in training. Test set 2, however, included testing images having a higher resolution than the images used in training.

Regarding the two embodiments of the image exposure transformation network, the researchers tested an image exposure transformation network trained using the multi-term loss function (without optical flow prediction), similar to the embodiment described in FIGS. 4A-4B. This embodiment is abbreviated IETN in FIG. 11 and in Table 1 shown below. In addition, the researchers tested an image exposure transformation network jointly trained with an optical flow prediction network, similar to the embodiment described in FIGS. 5A-5B. This embodiment is abbreviated IETN-Flow in FIG. 11 and in Table 1.

With respect to the baseline methods, the researchers compared the trained image exposure transformation networks mentioned above to four baseline methods. The first baseline method is a state-of-the-art approach on image-to-image enhancement that employs a multi-scale context aggregation network ("CAN"), often achieving notable results on low level image texture processing tasks. The second baseline method, called image-to-image translation with conditional adversarial networks ("Pix2Pix"), is an image-to-image translation approach that employs a conditional GAN and represents state-of-the-art approaches in image synthesis. The third and fourth baseline methods are variations of the Pix2Pix method. For example, Pix2Pix-Res represents the Pix2Pix model trained with the residual loss described above and Pix2Pix-MTL represent Pix2Pix model trained with the perceptual loss and the texture loss described above.

FIG. 11 shows sample qualitative results of the evaluations from test set 1. In particular, FIG. 11 shows the input 1102 used as a short-exposure target image and the ground truth 1116 used to quantitatively evaluate the results. In addition, FIG. 11 shows the long-exposure images generated by CAN 1104, Pix2Pix 1106, Pix2Pix-Res 1108, Pix2Pix-MTL 1110, IETN 1112, and IETN-Flow 1114. As mentioned above, the image generated by the IETN 1112 represents a synthesized long-exposure image generated by an embodiment of the image exposure transformation network trained using the multi-term loss function (e.g., FIG. 4A), and the image generated by the IETN-Flow 1114 represents a synthesized long-exposure image generated by an embodiment of the image exposure transformation network additionally trained with an optical flow prediction network (e.g., FIG. 5A).

Regarding the quantitative evaluations, the researchers measured the resemblance of each generated long-exposure image to the ground truth 1116. In particular, the researchers employed two image quality assessment metrics: peak signal to noise ratio (PSNR) and structural similarity (SSIM) index scores. In general, a PSNR score is a signal processing metric related to image de-noising that measures signal distortion with respect to a reference images (e.g., the ground truth 1116). The SSIM index scores measure the image structure similarity between images, which is a useful tool for measuring perceptual image quality. Results of the two image quality assessments are provided in Table 1 below for both test sets.

TABLE 1

| Transformation | CAN | | Pix2Pix | | Pix2Pix-Res | | Pix2Pix-MTL | | IETN | | IETN-Flow | |
| --- | --- | --- | --- | --- | --- | --- | --- | --- | --- | --- | --- | --- |
| Method: | PSNR | SSIM | PSNR | SSIM | PSNR | SSIM | PSNR | SSIM | PSNR | SSIM | PSNR | SSIM |
| Test Set 1 | 27.21 | 0.7145 | 25.11 | 0.6213 | 30.21 | 0.9011 | 28.99 | 0.8512 | 31.76 | 0.9121 | 32.99 | 0.9246 |
| Test Set 2 | 28.37 | 0.7319 | 27.77 | 0.6310 | 30.62 | 0.9029 | 29.47 | 0.8588 | 32.82 | 0.9291 | 33.25 | 0.9308 |

As shown in Table 1 as well as reflected in the corresponding images in FIG. 11, applying residual loss (i.e., Pix2Pix-Res) and multi-term loss (i.e., the Pix2Pix-MTL) greatly enhanced the baseline Pix2Pix model as well as caused the baseline Pix2Pix model to yield higher scores than the CAN model. This result shows the importance of utilizing the residual loss and the multi-term loss describe above.

Further, as shown in Table 1 as well as reflected in the corresponding images in FIG. 11, the basic image exposure transformation network (i.e., IETN 1112) outperformed each of the conventional models in both qualitative and quantitative results. Further, the image exposure transformation network additionally trained with an optical flow prediction network (i.e., IETN-Flow 1114) further enhanced and improved the basic image exposure transformation network. In addition, the researched performed a visual evaluation with controlled conditions and found that respondents confirmed the above results based on visual comparisons alone.

FIGS. 1-11, the corresponding text, and the examples provide a number of different methods, systems, devices, and non-transitory computer-readable media of the image transformation system 904. In addition to the foregoing, one or more embodiments can also be described in terms of flowcharts comprising acts for accomplishing a particular result, such as the flowcharts of acts shown in FIG. 12 and FIG. 13. Additionally, the acts described herein may be repeated or performed in parallel with one another or parallel with different instances of the same or similar acts.

Figure 12:
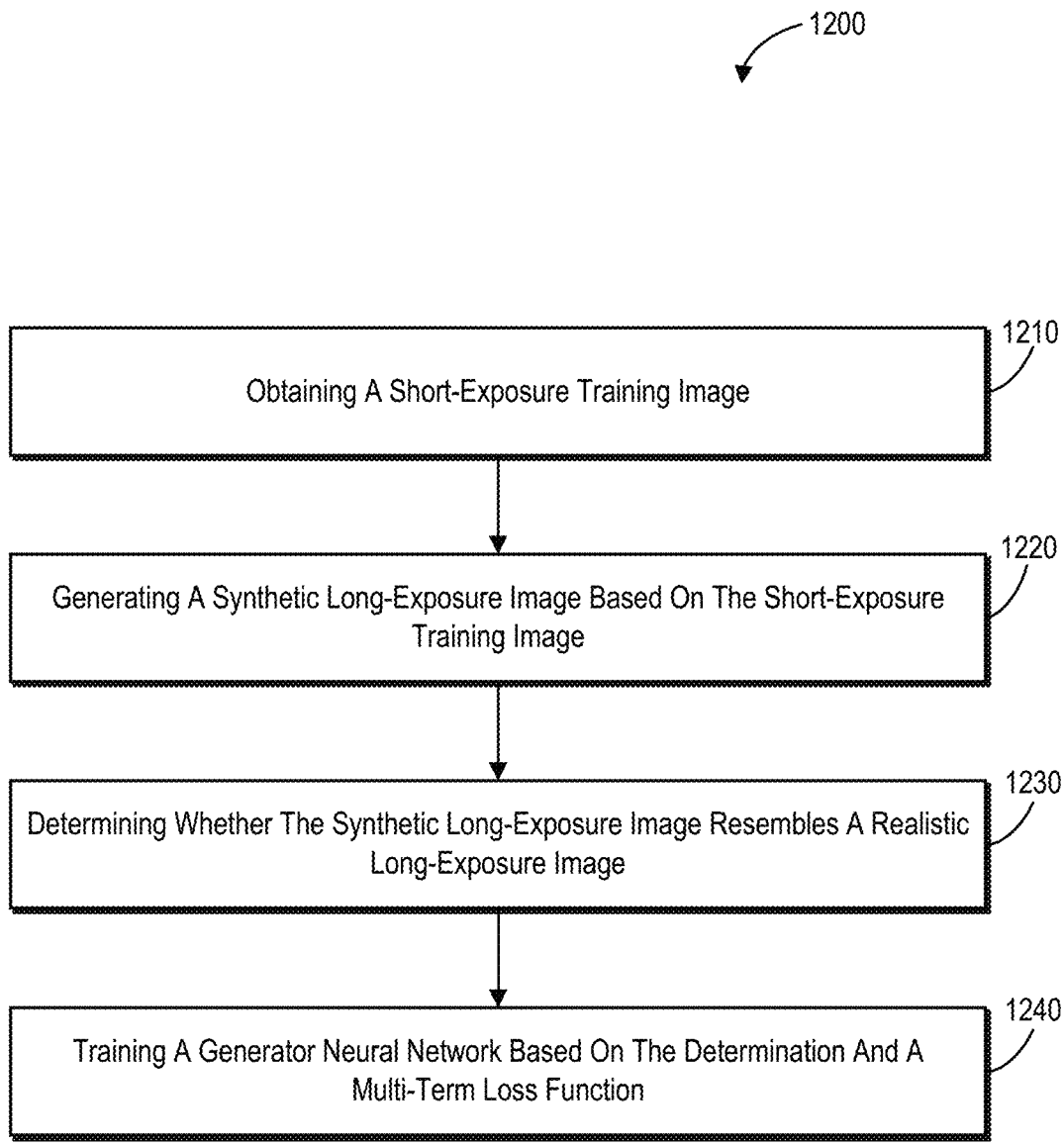
FIG. 12 illustrates a flowchart of a series of acts for training an image exposure transformation network in accordance with one or more embodiments.

As mentioned, FIG. 12 illustrates a flowchart of a series of acts 1200 for training an image exposure transformation network. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

In one or more embodiments, the series of acts 1200 is implemented on one or more computing devices, such as the computing device 900 or the client device 1004a. In addition, in some embodiments, the series of acts 1200 is implemented in a digital environment for creating or editing digital content (e.g., images). For example, the series of acts 1200 is implemented on a computing device having memory that includes a training dataset of image exposure pairs, each image exposure pair including a short-exposure training image and a long-exposure ground truth training image. In some embodiments, the memory also includes an image exposure generator neural network and an adversarial discriminator neural network that distinguishes realistic long-exposure images from non-realistic long-exposure images.

The series of acts 1200 includes an act 1210 of obtaining a short-exposure training image. In particular, the act 1210 can involve obtaining a first short-exposure training image from the training dataset of image exposure pairs. In some embodiments, the first optical flow prediction indicates movement and direction of pixels in the first short-exposure training image. In various embodiments, the act 1210 includes generating the first optical flow prediction for the first short-exposure training image utilizing an optical flow prediction network trained to predict the movement and direction of pixels from single short-exposure training images and providing the first optical flow prediction for the first short-exposure training image to the image exposure generator network.

As shown, the series of acts 1200 also includes an act 1220 of generating a synthesized long-exposure image based on the short-exposure training image. In particular, the act 1220 can involve generating a synthesized long-exposure image based on the first short-exposure training image using the image exposure generator neural network. In one or more embodiments, the act 1220 also includes generating the synthesized long-exposure image based on the first optical flow prediction.

As shown in FIG. 12, the series of acts 1200 further includes an act 1230 of determining whether the synthesized long-exposure image resembles a realistic long-exposure image. In particular, the act 1230 can include determining whether the synthesized long-exposure image resembles a real long-exposure image using the adversarial discriminator neural network. In one or more embodiments, the act 1230 is based on training the adversarial discriminator neural network based on a plurality of real long-exposure training images to learn features of naturally captured long-exposure images.

As shown, the series of acts 1200 also includes an act 1240 of training a generator neural network based on the determination and a multi-term loss function. In particular, the act 1240 can include training the image exposure generator neural network based on whether the synthesized long-exposure image resembles a real long-exposure image, a first long-exposure ground truth training image, and a multi-term loss function. In various embodiments, the multi-term loss function includes residual loss comparing the synthesized long-exposure image to the first long-exposure ground truth training image, perceptual loss comparing feature representations between the synthesized long-exposure image and the first long-exposure ground truth training image, and/or texture loss minimizing cross-entropy of gradients between the synthesized long-exposure image and the first long-exposure ground truth training image.

In some embodiments, the act 1240 also includes applying different weights to the residual loss, the perceptual loss, and the texture loss within the multi-term loss function. In various embodiments, the residual loss and the perceptual loss correspond to the image exposure generator neural network and the texture loss corresponds to the adversarial discriminator neural network.

The series of acts 1200 can also include a number of additional acts. In one or more embodiments, the series of acts 1200 includes the acts of training an optical flow prediction network to predict the movement and the direction of pixels of a subject object in single short-exposure training images using a flow loss function that compares endpoint error between pixels between the optical flow prediction and a ground truth optical flow. In some embodiments, the ground truth optical flow is generated from the first long-exposure ground truth training image.

In additional embodiments, training the image exposure generator neural network includes jointly training the image exposure generator neural network and the optical flow prediction network by alternating (e.g., back and forth) training between the image exposure generator neural network and the optical flow prediction network using a large learning rate until convergence, and subsequently training the image exposure generator neural network and the optical flow prediction network simultaneously using a small learning rate until convergence.

In various embodiments, the series of acts 1200 includes the acts of generating a first attention map for the first short-exposure training image utilizing an appearance guided attention network trained to predict a spatial context for single short-exposure training images, and providing the first attention map for the first short-exposure training image to the image exposure generator network. In some embodiments, the image exposure generator network utilizes the first attention map to identify regions of the first short-exposure training image to which to apply long-exposure effects.

In additional embodiments, the first attention map includes a plurality of regions corresponding to the first short-exposure training image. In some embodiments, each region of the plurality of regions includes an attention weight corresponding to motions influences within the region. In one or more embodiments, the series of acts 1200 includes the act of training the image exposure generator neural network by jointly training the image exposure generator neural network with the appearance guided attention network using the multi-term loss function and based on long-exposure ground truth training images.

In other embodiments the series of acts 1200 includes the acts of generating an image exposure pair within the training dataset of image exposure pairs by identifying a still video with a static background and a moving subject object, extracting a first frame and a second frame from the still video where the background is unchanged between the first frame and the second frame and where the moving subject object changes position between the first frame and the second frame, generating an averaged long-exposure ground truth image based on an averaged movement of the moving subject object between the first frame and the second frame, and creating the image exposure pair by associating the first frame with a short-exposure training image and associating the averaged long-exposure ground truth image with a corresponding long-exposure ground truth training image.

Figure 13:
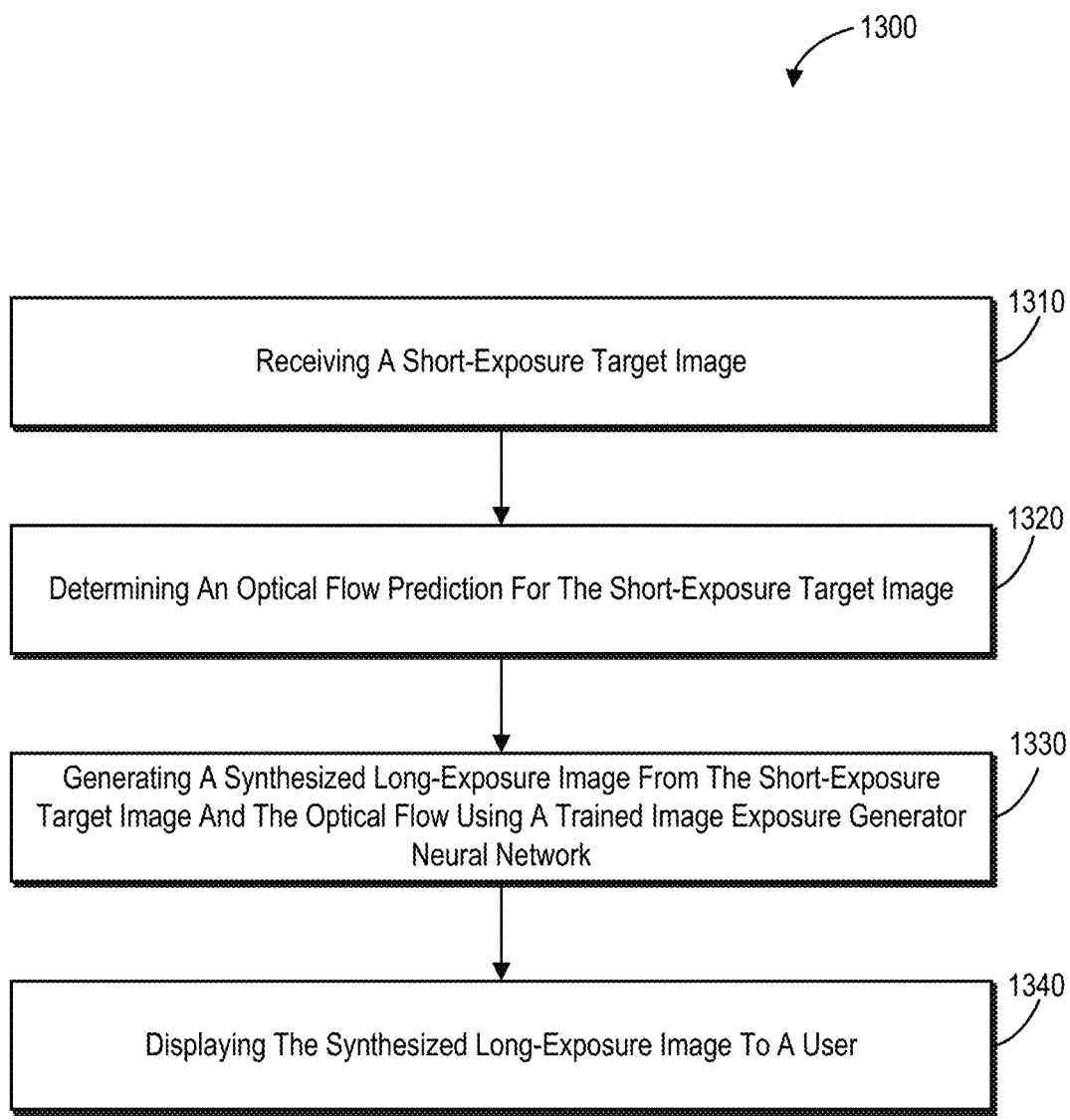
FIG. 13 illustrates a flowchart of a series of acts for generating a realistic long-exposure image from a single short-exposure image utilizing a trained image exposure transformation network in accordance with one or more embodiments.

As mentioned previously, FIG. 13 illustrates a flowchart of a series of acts 1300 for generating a realistic long-exposure image from a single short-exposure image utilizing a trained image exposure transformation network in accordance with one or more embodiments. While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer-readable medium can comprise instructions that, when executed by one or more processors, cause a computing device to perform the acts of FIG. 13. In one or more embodiments, a system can perform the acts of FIG. 13. In some embodiments, the series of acts 1300 is implemented by a computing system on one or more computing devices, such as the computing device 900 or the client device 1004*a*.

As shown, the series of acts 1300 includes an act 1310 of receiving a short-exposure target image. In one or more embodiments, the short-exposure target image is captured by a camera of a mobile client device in real-time. In alternative embodiments, the short-exposure target image is a previously captured short-exposure image that is stored in memory.

As shown, the series of acts 1300 also includes an act 1320 of determining an optical flow prediction for the short-exposure target image. In particular, the act 1320 can involve determining an optical flow prediction for the short-exposure target image using a trained optical flow prediction network that indicates pixel movement and direction data in the short-exposure target image. In one or more embodiments, the optical flow prediction network image exposure network predicts the movement and the direction of pixels within single short-exposure images. In various embodiments, the optical flow prediction network is trained to predict the movement and the direction of pixels from single short-exposure training images using a flow loss function endpoint error between pixels between the optical flow prediction and a ground truth optical flow. In additional embodiments, the ground truth optical flow is generated from the first long-exposure ground truth training image.

As shown, the series of acts 1300 includes an act 1330 of generating a synthesized long-exposure image from the short-exposure target image and the optical flow using an image exposure trained generator neural network. In particular, the act 1330 can involve generating a synthesized long-exposure image from the short-exposure target image and the optical flow prediction using a trained image exposure generator neural network by applying long-exposure effects to learned features of the short-exposure target image based on the pixel movement and direction data. In some embodiments, the act 1330 includes learning features of the trained image exposure generator neural network through adversarial learning via an adversarial discriminator neural network jointly trained to distinguish realistic long-exposure images from non-realistic long-exposure images. In various embodiments, the optical flow prediction network is jointly trained with the image exposure transformation network based on long-exposure ground truth training images.

As shown, the series of acts 1300 also includes an act 1340 of displaying the synthesized long-exposure image to a user. In particular, the act 1340 can include displaying the synthesized long-exposure image within a graphical user interface to a user. In some embodiments, the act 1340 includes displaying the synthesized long-exposure image to the user via a mobile client device associated with the user.

In various embodiments, the series of acts 1300 can also include a number of additional acts. For example, the series of acts 1300 includes the acts of creating a target attention map based on the short-exposure target image that indicates exposure attention weights for regions in the short-exposure target image. In some embodiments, the appearance guided attention network generates attention maps for short-exposure images where each attention map includes regions and corresponding weighted parameters indicating motions influences within the regions.

In additional embodiments, the series of acts 1300 includes the act of generating the synthesized long-exposure image by further applying the pixel movement and direction data according to the exposure attention weights to the short-exposure target image. In various embodiments, the series of acts 1300 includes the act of receiving user input modifying an exposure weight within the target attention map for a selected region in the short-exposure target image.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the image transformation system to adversarially train and employ the image exposure transformation network, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
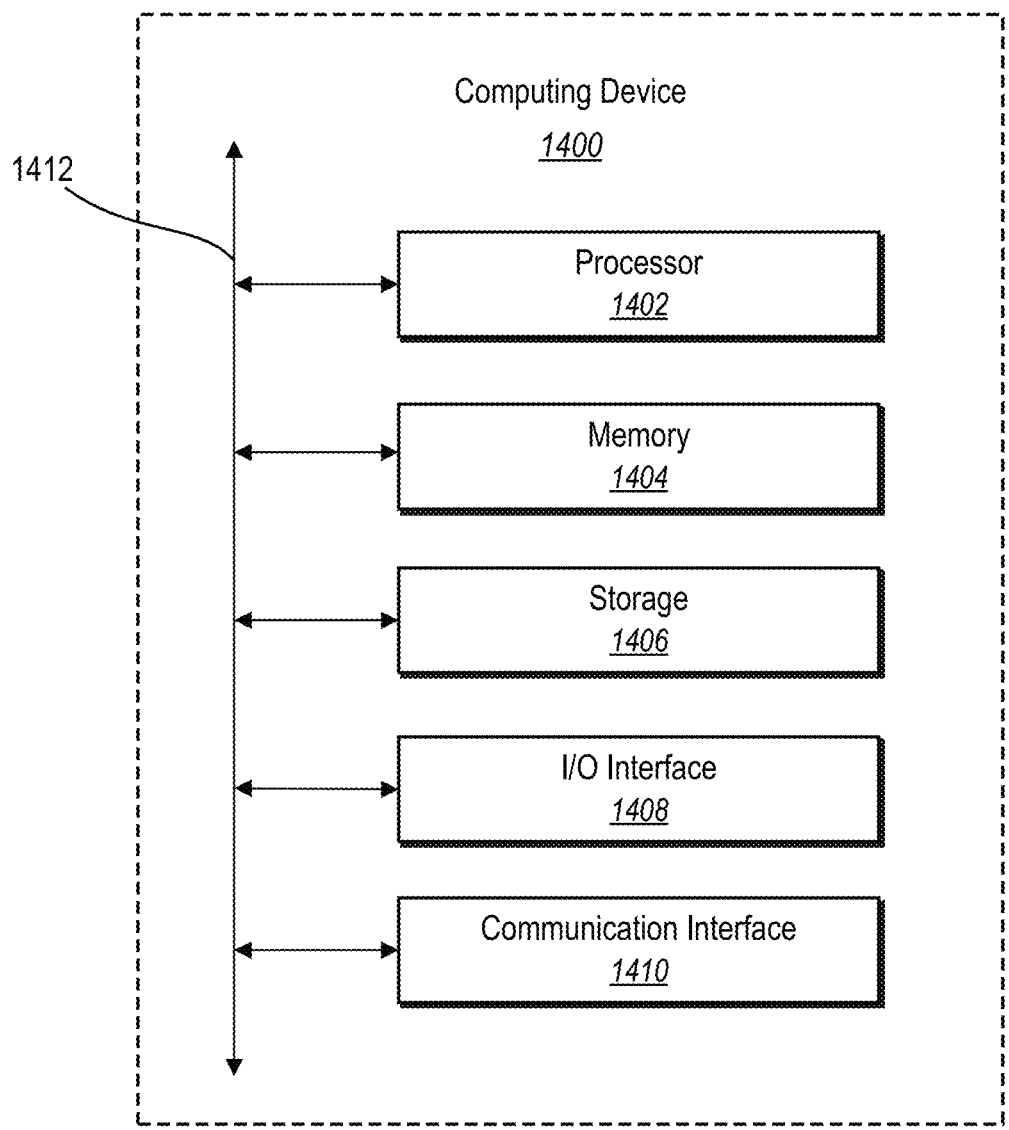
FIG. 14 illustrates a block diagram of an example computing device for implementing one or more embodiments of the present disclosure.

FIG. 14 illustrates a block diagram of an exemplary computing device 1400 that may be configured to perform one or more of the processes described above. One will appreciate that one or more computing devices, such as the computing device 1400 may represent the computing devices described above (e.g., computing device 900, server device(s) 1002, and client devices 1004*a-b*). In one or more embodiments, the computing device 1400 may be a mobile device (e.g., a laptop, a tablet, a smartphone, a mobile telephone, a camera, a tracker, a watch, a wearable device, etc.). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output ("I/O") interfaces 1408, and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
receive a short-exposure target image;
determine an attention map for the short-exposure target image utilizing an appearance guided attention neural network, the attention map comprising transformation regions and corresponding magnitudes for the short-exposure target image;
generate a synthesized long-exposure image from the short-exposure target image and the attention map utilizing an image exposure generator neural network by applying long-exposure effects to the short-exposure target image based on the transformation regions and the corresponding magnitudes; and
display, to a client device, the synthesized long-exposure image within a graphical user interface.

2. The non-transitory computer-readable medium of claim 1, further comprising additional instructions that, when executed by the at least one processor, cause the computer system to receive the short-exposure target image from a live camera capture of a mobile client device.

3. The non-transitory computer-readable medium of claim 1, further comprising additional instructions that, when executed by the at least one processor, cause the computer system to receive the short-exposure target image from a storage medium.

4. The non-transitory computer-readable medium of claim 1, further comprising additional instructions that, when executed by the at least one processor, cause the computer system to determine the attention map for the short-exposure target image by generating spatial context predictions of the short-exposure target image utilizing an appearance guided attention neural network.

5. The non-transitory computer-readable medium of claim 1, further comprising additional instructions that, when executed by the at least one processor, cause the computer system to determine magnitudes corresponding to the transformation regions within the attention map that comprise weighted parameters indicating motions influences within the transformation regions.

6. The non-transitory computer-readable medium of claim 5, further comprising added instructions that, when executed by the at least one processor, cause the computer system to generate the synthesized long-exposure image utilizing the image exposure generator neural network by applying the long-exposure effects to the transformation regions of the short-exposure target image according to the weighted parameters of the corresponding magnitudes.

7. The non-transitory computer-readable medium of claim 1, further comprising additional instructions that, when executed by the at least one processor, cause the computer system to generate the synthesized long-exposure image utilizing the image exposure generator neural network further based on input modifying an exposure magnitude to one or more transformation regions of the attention map.

8. The non-transitory computer-readable medium of claim 1, further comprising additional instructions that, when executed by the at least one processor, cause the computer system to generate the synthesized long-exposure image utilizing the image exposure generator neural network by applying the long-exposure effects to learned features of the short-exposure target image based on attention weights within the attention map in accordance with the transformation regions and the corresponding magnitudes.

9. The non-transitory computer-readable medium of claim 1, further comprising additional instructions that, when executed by the at least one processor, cause the computer system to generate the synthesized long-exposure image utilizing the image exposure generator neural network further based on an optical flow prediction.

10. The non-transitory computer-readable medium of claim 9, further comprising added instructions that, when executed by the at least one processor, cause the computer system to generate the optical flow prediction utilizing an optical flow prediction network that indicates pixel movement and direction data in the short-exposure target image.

11. A system for synthesizing long-exposure images from single short-exposure images comprising:
a memory device comprising:
a short-exposure target image;
an appearance guided attention neural network; and
an image exposure generator neural network;
at least one computing device configured to cause the system to:
generate an attention map that comprises a spatial context of the short-exposure target image utilizing the appearance guided attention neural network on the short-exposure target image;
generate a synthesized long-exposure image from the short-exposure target image and the attention map, utilizing the image exposure generator neural network, by applying long-exposure effects to learned features of the short-exposure target image based on attention weights within the attention map; and
provide the synthesized long-exposure image for display.

12. The system of claim 11, wherein the at least one computing device is further configured to cause the system to determine the attention map for the short-exposure target image by generating spatial context predictions of the short-exposure target image utilizing an appearance guided attention neural network.

13. The system of claim 11, wherein the at least one computing device is further configured to cause the system to determine the attention weights within the attention map to indicate magnitudes for corresponding transformation regions within the attention map.

14. The system of claim 13, wherein the at least one computing device is further configured to cause the system to generate the synthesized long-exposure image utilizing the image exposure generator neural network by applying the long-exposure effects to the transformation regions of the short-exposure target image according to corresponding magnitudes as indicated by the attention weights.

15. The system of claim 11, wherein the at least one computing device is further configured to cause the system to provide the synthesized long-exposure image for display on a graphical user interface of a mobile client device.

16. In a digital medium environment for editing electronic images, a computer-implemented method of transforming exposure time of images, comprising:
receiving a short-exposure target image;
determining an attention map for the short-exposure target image utilizing an appearance guided attention neural network that indicates transformation regions and corresponding magnitudes in the short-exposure target image;
generating a synthesized long-exposure image from the short-exposure target image, utilizing an image exposure generator neural network, by applying long-exposure effects to the transformation regions of the short-exposure target image in accordance with the corresponding magnitudes as indicated in the attention map; and providing the synthesized long-exposure image for display within a graphical user interface.

17. The method of claim 16, further comprising receiving the short-exposure target image from a live camera capture of a mobile client device.

18. The method of claim 16, further comprising generating the synthesized long-exposure image utilizing the image exposure generator neural network further based on input modifying an exposure magnitude to one or more transformation regions of the attention map.

19. The method of claim 16, further comprising generating the synthesized long-exposure image utilizing the image exposure generator neural network further based on an optical flow prediction.

20. The method of claim 16, further comprising determining, for each transformation region of the transformation regions, one or more features, wherein the corresponding magnitudes comprise an long-exposure importance of the one or more features within a transformation region.

* * * * *